United States Patent
Kobayashi et al.

(10) Patent No.: US 9,120,482 B2
(45) Date of Patent: Sep. 1, 2015

(54) CONTROL DEVICE

(75) Inventors: Yasuhiko Kobayashi, Anjo (JP); Yuma Mori, Kota (JP)

(73) Assignee: AISIN AW CO., LTD., Anjo (JP)

( * ) Notice: Subject to any disclaimer, the term of this patent is extended or adjusted under 35 U.S.C. 154(b) by 122 days.

(21) Appl. No.: 14/119,791

(22) PCT Filed: Aug. 7, 2012

(86) PCT No.: PCT/JP2012/070094
§ 371 (c)(1),
(2), (4) Date: Nov. 22, 2013

(87) PCT Pub. No.: WO2013/021997
PCT Pub. Date: Feb. 14, 2013

(65) Prior Publication Data
US 2014/0088812 A1 Mar. 27, 2014

(30) Foreign Application Priority Data
Aug. 8, 2011 (JP) .................... 2011-173218

(51) Int. Cl.
*B60W 10/02* (2006.01)
*B60W 20/00* (2006.01)
(Continued)

(52) U.S. Cl.
CPC ............... *B60W 20/10* (2013.01); *B60K 6/387* (2013.01); *B60K 6/48* (2013.01); *B60K 6/547* (2013.01); *B60L 3/003* (2013.01); *B60L 3/0061* (2013.01);
(Continued)

(58) Field of Classification Search
CPC ..... B60W 10/02; B60W 10/06; B60W 10/08; B60W 20/00; B60K 6/48; B60K 6/348; B60L 11/14; B60L 15/20

USPC ........................ 701/22.81, 90, 82, 71, 74, 69; 180/65.22
See application file for complete search history.

(56) References Cited

U.S. PATENT DOCUMENTS 4,180,037 A * 12/1979 Hobo et al. ................... 123/506
8,498,765 B2 7/2013 Tajima et al.
(Continued)

FOREIGN PATENT DOCUMENTS

CN 102725172 A 10/2012
JP A-2000-27672 1/2000
(Continued)

OTHER PUBLICATIONS

International Search Report issued in International Patent Application No. PCT/JP2012/070094 dated Sep. 11, 2012.

*Primary Examiner* — Tan Q Nguyen
(74) *Attorney, Agent, or Firm* — Oliff PLC

(57) ABSTRACT

A control device for a vehicle drive configured with a power transfer path that includes a first engagement device, a rotary electric machine, and a second engagement device. These elements being arranged in this order from an input member coupled to an engine to an output member that is coupled to the wheels of the vehicle. The control device is configured with an control section that controls output torque of the rotary electric machine such that a rotational speed becomes closer to a target rotational speed with both the first and second engagement devices brought into a slip engagement state and with the rotary electric machine generating electric power. The control section maintains control in which at least one of a temperature of the rotary electric machine and a temperature of an inverter is monitored as a monitoring target temperature.

6 Claims, 9 Drawing Sheets

(51) Int. Cl.

| | | |
|---|---|---|
| *B60L 11/14* | (2006.01) | |
| *B60W 10/08* | (2006.01) | |
| *H02P 29/00* | (2006.01) | |
| *H02P 3/06* | (2006.01) | |
| *B60L 3/00* | (2006.01) | |
| *B60W 30/184* | (2012.01) | |
| *B60K 6/387* | (2007.10) | |
| *B60L 15/20* | (2006.01) | |
| *B60K 6/547* | (2007.10) | |
| *B60K 6/48* | (2007.10) | |

(52) U.S. Cl.
CPC ............... *B60L 11/14* (2013.01); *B60L 15/20* (2013.01); *B60W 10/02* (2013.01); *B60W 10/08* (2013.01); *B60W 20/00* (2013.01); *B60W 20/106* (2013.01); *B60W 30/1843* (2013.01); *H02P 3/06* (2013.01); *H02P 29/0088* (2013.01); *B60K 2006/4825* (2013.01); *B60L 2240/525* (2013.01); *B60L 2240/545* (2013.01); *B60W 20/108* (2013.01); *B60W 2510/087* (2013.01); *B60W 2710/081* (2013.01); *Y02T 10/6221* (2013.01); *Y02T 10/6252* (2013.01); *Y02T 10/642* (2013.01); *Y02T 10/70* (2013.01); *Y02T 10/7077* (2013.01); *Y02T 10/7258* (2013.01)

(56) References Cited

U.S. PATENT DOCUMENTS

| | | |
|---|---|---|
| 8,992,377 B2 | 3/2015 | Kobayashi |
| 2007/0272456 A1 | 11/2007 | Shiiba |
| 2009/0314564 A1* | 12/2009 | Okamura et al. ........ 180/65.285 |
| 2011/0039655 A1 | 2/2011 | Kaltenbach et al. |
| 2011/0307132 A1* | 12/2011 | Hashimoto ................ 701/22 |
| 2012/0271498 A1 | 10/2012 | Kobayashi |
| 2014/0371029 A1 | 12/2014 | Kobayashi et al. |

FOREIGN PATENT DOCUMENTS

| | | |
|---|---|---|
| JP | A-2003-9307 | 1/2003 |
| JP | A-2008-7094 | 1/2008 |
| JP | A-2008-222222 | 9/2008 |
| JP | A-2011-507746 | 3/2011 |

* cited by examiner

CONTROL DEVICE

INCORPORATION BY REFERENCE

The disclosure of Japanese Patent Application No. 2011-173218 filed on Aug. 8, 2011 including the specification, drawings and abstract is incorporated herein by reference in its entirety.

BACKGROUND OF THE INVENTION

The present invention relates to a control device that controls a vehicle drive device in which a first engagement device, a rotary electric machine, and a second engagement device are provided on a power transfer path connecting between an input member drivably coupled to an internal combustion engine and an output member drivably coupled to wheels and are arranged in this order from the side of the input member.

DESCRIPTION OF THE RELATED ART

A device described in Japanese Patent Application Publication No. 2008-7094 (JP 2008-7094 A) mentioned below, for example, is known as a drive device for a hybrid vehicle including an internal combustion engine and a rotary electric machine each serving as a drive force source. The hybrid vehicle does not include an element that absorbs fluctuations in rotational speed of the drive force source such as a torque converter. Therefore, in the technology according to JP 2008-7094 A, when the vehicle starts to travel or is traveling at an extremely low speed, the internal combustion engine is started, or the like, a first engagement element and a second engagement device provided in the drive device are controlled to a slip engagement state so as to able to transfer a drive force even if there is a rotational speed difference between the rotational speed of each drive force source and the rotational speed of wheels.

In the technology according to JP 2008-7094 A, not only the second engagement device but also the first engagement device is controlled to the slip engagement state. This allows the rotational speed of the rotary electric machine to be reduced with respect to the rotational speed of the internal combustion engine for an amount corresponding to the slip amount of the first engagement device, which results in a decrease in slip amount of the second engagement device. The amount of heat generated by the second engagement device is decreased by an amount corresponding to the decrease in slip amount of the second engagement device, which suppresses degradation of the second engagement device due to overheating.

If the first engagement device is brought into the slip engagement state and the rotational speed of the rotary electric machine is reduced in the case where it is necessary for the rotary electric machine to generate electric power using a drive force of the internal combustion engine, such as in the case where the charge amount of a battery is small and the electric power consumption amount is large, however, it is necessary to increase the magnitude (absolute value) of regenerative torque to be output from the rotary electric machine in accordance with the amount of reduction in rotational speed in order to secure the necessary electric power generation amount. Increasing the magnitude of the regenerative torque increases a current flowing through a coil of the rotary electric machine to increase the amount of heat generated by the coil. This raises the coil temperature, and the coil temperature exceeding a predetermined tolerable upper-limit value may promote degradation of the coil. In addition, an increase in current flowing through the rotary electric machine also increases the amount of heat generated by an inverter that controls the rotary electric machine. This raises the inverter temperature, and the inverter temperature exceeding a predetermined tolerable upper-limit value may promote degradation of the inverter.

SUMMARY OF THE INVENTION

It is therefore desirable to provide a control device capable of suppressing overheating of a rotary electric machine and an inverter due to a current flowing through the rotary electric machine and the inverter, while securing the necessary electric power generation amount, in the case where both a first engagement device and a second engagement device are brought into a slip engagement state and the rotary electric machine is generating electric power.

According to an aspect of the present invention, a control device controls a vehicle drive device in which a first engagement device, a rotary electric machine, and a second engagement device are provided on a power transfer path connecting between an input member drivably coupled to an internal combustion engine and an output member drivably coupled to wheels and are arranged in this order from a side of the input member. The control device includes: an electric power generation-rotational speed control section that executes electric power generation-rotational speed control in which output torque of the rotary electric machine is controlled such that a rotational speed of the rotary electric machine becomes closer to a target rotational speed with both the first engagement device and the second engagement device brought into a slip engagement state and with the rotary electric machine generating electric power. During the electric power generation-rotational speed control, the electric power generation-rotational speed control section executes electric power generation amount maintaining control in which at least one of a temperature of the rotary electric machine and a temperature of an inverter is monitored as a monitoring target temperature, the target rotational speed is decided on the basis of the monitoring target temperature, and an amount of electric power generated by the rotary electric machine during the electric power generation-rotational speed control is maintained at a target electric power generation amount.

The term "rotary electric machine" as used herein refers to any of a motor (electric motor), a generator (electric generator), and a motor generator that functions both as a motor and as a generator as necessary.

The term "drivably coupled" as used herein refers to a state in which two rotary elements are coupled to each other so as to enable transfer of a drive force, which includes a state in which the two rotary elements are coupled to each other so as to rotate together with each other, and a state in which the two rotary elements are coupled to each other via one or two or more transmission members so as to enable transfer of a drive force. Examples of such transmission members include various members that transfer rotation at an equal speed or a changed speed, such as a shaft, a gear mechanism, a belt, and a chain. Additional examples of such transmission members include engagement devices that selectively transfer rotation and a drive force, such as a friction engagement device and a meshing-type engagement device.

According to the configuration described above, the electric power generation-rotational speed control is executed with the rotary electric machine generating electric power and with both the first engagement device and the second engagement device brought into the slip engagement state. In this state, the rotational speed of the rotary electric machine is reduced with respect to the rotational speed of the internal combustion engine by an amount corresponding to the difference in rotational speed between the engagement members of the first engagement device. Also in this case, the magnitude of the regenerative torque of the rotary electric machine is increased in accordance with the amount of reduction in rotational speed of the rotary electric machine through the electric power generation amount maintaining control, which allows the amount of electric power generated by the rotary electric machine to be maintained at the necessary target electric power generation amount.

On the other hand, an increase in magnitude of the regenerative torque raises the temperature of the rotary electric machine and the temperature of the inverter. Thus, by monitoring at least one of the temperature of the rotary electric machine and the temperature of the inverter as the monitoring target temperature and deciding the target rotational speed on the basis of the monitoring target temperature as in the configuration described above, the magnitude of the regenerative torque can be decreased through the electric power generation amount maintaining control by increasing the target rotational speed for the rotary electric machine such that the monitoring target temperature is not raised excessively. Hence, it is possible to suppress a rise in monitoring target temperature while securing the necessary electric power generation amount, and to suppress overheating of the rotary electric machine or the inverter (or both; the same applies hereinafter).

Alternatively, in the case where the monitoring target temperature is low, the target rotational speed for the rotary electric machine may be decreased to increase the magnitude of the regenerative torque through the electric power generation amount maintaining control. That is, the target rotational speed for the rotary electric machine can be decreased within such a range that the rotary electric machine or the inverter may not be overheated, for example, which makes it possible to reduce the difference in rotational speed between the engagement members of the second engagement device to suppress heat generation.

With both the first engagement device and the second engagement device brought into the slip engagement state, it is possible to increase and decrease the target rotational speed for the rotary electric machine without varying the rotational speed of the internal combustion engine and the rotational speed of the wheels. Hence, it is possible to enhance the controllability of the monitoring target temperature through the electric power generation-rotational speed control.

Here, in the case where the monitoring target temperature falls within a control temperature region determined in advance, the electric power generation-rotational speed control section may decide the target rotational speed such that the target rotational speed becomes higher as the monitoring target temperature becomes higher.

According to the configuration, as the monitoring target temperature becomes higher, the target rotational speed is increased to a greater degree, and the magnitude of the regenerative torque becomes smaller. Thus, it is possible to more effectively decrease the heat generation amount of the rotary electric machine or the inverter, as the monitoring target temperature becomes higher. Hence, it is possible to more reliably suppress a rise in monitoring target temperature as the monitoring target temperature becomes higher. Thus, it is possible to effectively prevent the monitoring target temperature from exceeding a predetermined temperature.

Here, in the case where the monitoring target temperature becomes a tolerable upper-limit temperature determined in advance, the electric power generation-rotational speed control section may increase the target rotational speed to a temperature-balancing rotational speed that is a rotational speed which is prescribed in accordance with the target electric power generation amount and at which the monitoring target temperature does not exceed the tolerable upper-limit temperature irrespective of an operating time of the rotary electric machine.

According to the configuration, in the case where the monitoring target temperature becomes the tolerable upper-limit temperature, the rotational speed of the rotary electric machine is raised to the temperature-balancing rotational speed at which the monitoring target temperature is steadily at the tolerable upper-limit temperature, which prevents the monitoring target temperature from exceeding the tolerable upper-limit temperature. Hence, it is possible to suppress progress of degradation of the rotary electric machine or the inverter.

The electric power generation-rotational speed control section may decide a first target rotational speed based on the temperature of the rotary electric machine and a second target rotational speed based on the temperature of the inverter, and decide the target rotational speed on the basis of a higher one of the first target rotational speed and the second target rotational speed.

According to the configuration, it is possible to appropriately decide the target rotational speed during the electric power generation amount maintaining control on the basis of the temperature of the rotary electric machine and the temperature of the inverter, and to suppress overheating of both the rotary electric machine and the inverter.

In the case where the monitoring target temperature is less than a lower-limit value of a control temperature region determined in advance, the electric power generation-rotational speed control section may decide the target rotational speed as a lower-limit rotational speed at which the target electric power generation amount can be secured.

According to the configuration, in the case where the monitoring target temperature is less than the lower-limit value, the rotational speed of the rotary electric machine can be reduced to the lower limit at which the target electric power generation amount can be secured, and the difference in rotational speed between the engagement members of the second engagement device can be decreased. Hence, it is possible to reduce heat generation with the second engagement device in the slip engagement state, and to suppress overheating of the second engagement device.

During the electric power generation amount maintaining control, the electric power generation-rotational speed control section may decide target torque to be output from the rotary electric machine on the basis of the target rotational speed and the target electric power generation amount, and control any one or more of transfer torque of the first engagement device, transfer torque of the second engagement device, and output torque of the internal combustion engine on the basis of the target torque.

According to the configuration, it is possible to vary torque applied from the outside to the inertial system of the rotary electric machine by an amount corresponding to increase and decrease in target torque to be output from the rotary electric machine by controlling any one or more of the transfer torque of the first engagement device, the transfer torque of the second engagement device, and the output torque of the internal combustion engine. In order to cancel variations in rotational speed of the rotary electric machine due to the increase and decrease in externally applied torque, the output torque of the rotary electric machine is automatically increased and decreased by an amount corresponding to the increase and decrease in target torque to be output from the rotary electric machine through the rotational speed control for the rotary electric machine. Hence, the output torque of the rotary electric machine can be indirectly varied by an amount corresponding to the increase and decrease in target torque to be output from the rotary electric machine, and the amount of electric power generated by the rotary electric machine can be maintained at the target electric power generation amount.

DETAILED DESCRIPTION OF THE EMBODIMENTS

Figure 1:
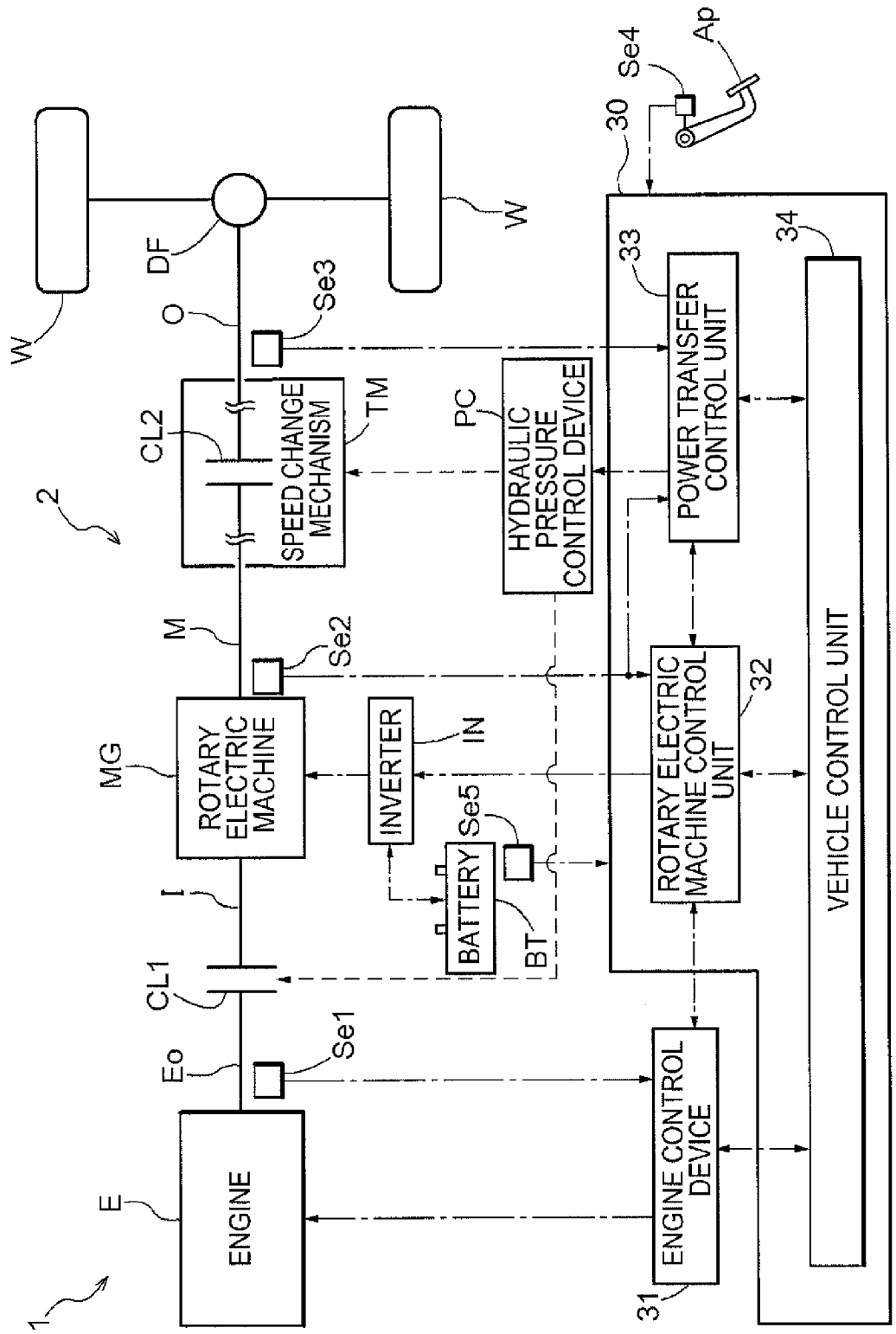
FIG. 1 is a schematic diagram showing a schematic configuration of a vehicle drive device and a control device according to an embodiment of the present invention.

A control device 30 according to an embodiment of the present invention will be described with reference to the drawings. FIG. 1 is a schematic diagram showing a schematic configuration of a vehicle drive device 1 and the control device 30 according to the embodiment. In the drawing, the solid lines each indicate a drive force transfer path, the broken lines each indicate a working oil supply path, and the dash-dotted lines each indicate a signal transfer path. As shown in the drawing, the vehicle drive device 1 according to the embodiment is generally configured to include an engine E and a rotary electric machine MG each serving as a drive force source, and to transfer drive forces of the drive force sources to wheels W via a power transfer mechanism. In the vehicle drive device 1, a first engagement device CL1, the rotary electric machine MG, and a second engagement device CL2 are provided on a power transfer path 2 connecting between an engine output shaft Eo drivably coupled to the engine E and an output shaft O drivably coupled to the wheels W, and are arranged in this order from the side of the engine output shaft Eo. Here, the first engagement device CL1 drivably couples and decouples the engine E and the rotary electric machine MG to and from each other in accordance with the engagement state. The second engagement device CL2 drivably couples and decouples the rotary electric machine MG and the wheels W to and from each other in accordance with the engagement state. In the vehicle drive device 1 according to the embodiment, a speed change mechanism TM is provided on a portion of the power transfer path 2 between the rotary electric machine MG and the wheels W. The second engagement device CL2 is one of a plurality of engagement devices provided in the speed change mechanism TM. The engine output shaft Eo corresponds to the "input member" according to the present invention, and the output shaft O corresponds to the "output member" according to the present invention.

A hybrid vehicle includes the control device 30 which controls the vehicle drive device 1. The control device 30 according to the embodiment includes a rotary electric machine control unit 32 that controls the rotary electric machine MG, a power transfer control unit 33 that controls the speed change mechanism TM, the first engagement device CL1, and the second engagement device CL2, and a vehicle control unit 34 that integrates these control devices to control the vehicle drive device 1. The hybrid vehicle also includes an engine control device 31 that controls the engine E.

Figure 2:
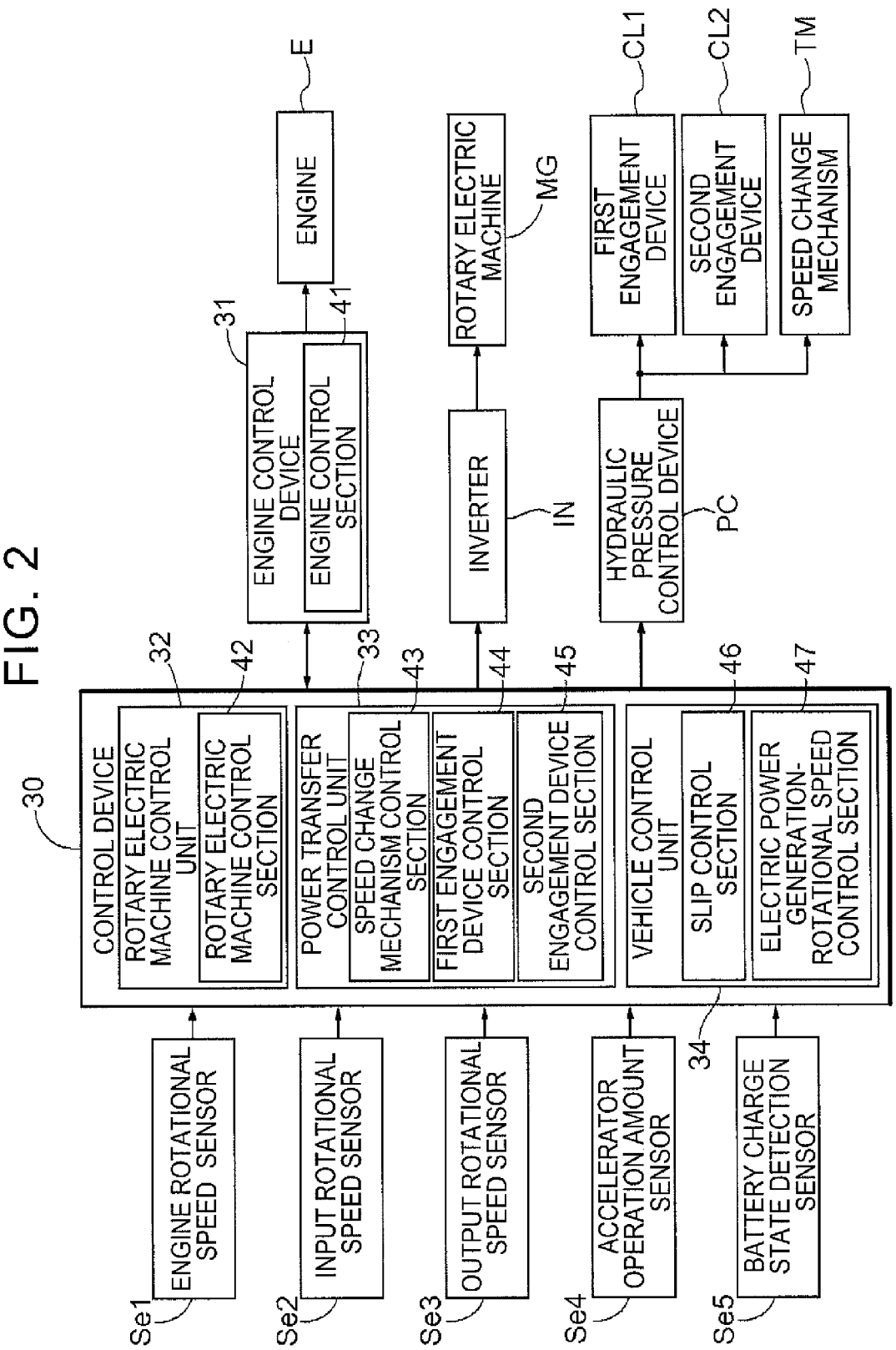
FIG. 2 is a block diagram showing the configuration of the control device according to the embodiment of the present invention.

As shown in FIG. 2, the control device 30 includes an electric power generation-rotational speed control section 47. The electric power generation-rotational speed control section 47 executes electric power generation-rotational speed control in which output torque Tm of the rotary electric machine MG is controlled such that a rotational speed $\omega m$ of the rotary electric machine MG becomes closer to a target rotational speed $\omega mo$ with both the first engagement device CL1 and the second engagement device CL2 brought into the slip engagement state and with the rotary electric machine MG generating electric power. The electric power generation-rotational speed control section 47 is characterized in executing, in the electric power generation-rotational speed control, electric power generation amount maintaining control in which at least one of a coil temperature Tc as the temperature of the rotary electric machine MG and a temperature Tin of an inverter IN is monitored as a monitoring target temperature and in which a target rotational speed $\omega mo$ is decided on the basis of the monitoring target temperature and an electric power generation amount Wg of the rotary electric machine MG during the electric power generation-rotational speed control is maintained at a target electric power generation amount Wgo. The vehicle drive device 1 and the control device 30 according to the embodiment will be described in detail below.

1. Configuration of Vehicle Drive Device 1

First, the configuration of the vehicle drive device 1 of the hybrid vehicle according to the embodiment will be described.

As shown in FIG. 1, the hybrid vehicle is a parallel-type hybrid vehicle which includes the engine E and the rotary electric machine MG each serving as a drive force source for the vehicle and in which the engine E and the rotary electric machine MG are drivably coupled to each other in series. The hybrid vehicle includes the speed change mechanism TM, which transfers rotation of the engine E and the rotary electric machine MG transmitted to an intermediate shaft M to the output shaft O while changing the rotational speed and converting torque.

The engine E is an internal combustion engine driven by combustion of fuel. Various engines known in the art such as a gasoline engine and a diesel engine, for example, may be used as the engine E. In the example, the engine output shaft Eo such as a crankshaft of the engine E is selectively drivably coupled via the first engagement device CL1 to the input shaft I drivably coupled to the rotary electric machine MG. That is, the engine E is selectively drivably coupled to the rotary electric machine MG via the first engagement device CL1 which is a friction engagement element. It is also suitable that the engine output shaft Eo is drivably coupled to an input member of the first engagement device CL1 via other members such as a damper.

The rotary electric machine MG includes a stator fixed to a non-rotary member and a rotor supported radially inwardly of the stator so as to be rotatable. A coil is wound around the stator. The rotor of the rotary electric machine MG is drivably coupled to the input shaft I and the intermediate shaft M to rotate together with the input shaft I and the intermediate shaft M. That is, in the embodiment, both the engine E and the rotary electric machine MG are drivably coupled to the input shaft I and the intermediate shaft M. The coil of the rotary electric machine MG is electrically connected to a battery BT serving as an electricity accumulation device via the inverter IN which performs a DC/AC conversion. The rotary electric machine MG can function as a motor (electric motor) that is supplied with electric power to produce power and as a generator (electric generator) that is supplied with power to generate electric power. That is, the rotary electric machine MG performs power running using electric power supplied from the battery BT via the inverter IN, or generates electric power using a rotational drive force transferred from the engine E or the wheels W to accumulate the generated electric power in (charge) the battery BT via the inverter IN. The battery BT is an example of the electricity accumulation device. Other types of electricity accumulation devices such as a capacitor may be used, or a plurality of types of electricity accumulation devices may be used in combination. In the following description, electric power generation performed by the rotary electric machine MG is referred to as "regeneration" or "regenerative power generation", and negative torque output from the rotary electric machine MG during electric power generation is referred to as "regenerative torque". In the case where rotary electric machine required torque Tmo is negative torque, the rotary electric machine MG outputs regenerative torque while generating electric power using a rotational drive force transferred from the engine E or the wheels W.

The speed change mechanism TM is drivably coupled to the intermediate shaft M. In the embodiment, the speed change mechanism TM is a stepped automatic transmission that provides a plurality of shift speeds with different speed ratios. In order to establish the plurality of shift speeds, the speed change mechanism TM includes a gear mechanism such as a planetary gear mechanism and a plurality of engagement devices. In the embodiment, one of the plurality of engagement devices is the second engagement device CL2. The speed change mechanism TM transfers rotation of the intermediate shaft M to the output shaft O while changing the rotational speed with the speed ratio of each shift speed and converting torque. The torque transferred from the speed change mechanism TM to the output shaft O is distributed and transferred to two, left and right, axles via an output differential gear device DF to be transferred to the wheels W drivably coupled to the axles. Here, the term "speed ratio" refers to the ratio of the rotational speed of the intermediate shaft M to the rotational speed of the output shaft O for a case where each shift speed is established in the speed change mechanism TM. The speed ratio has a value obtained by dividing the rotational speed of the intermediate shaft M by the rotational speed of the output shaft O. That is, the rotational speed of the output shaft O is obtained by dividing the rotational speed of the intermediate shaft M by the speed ratio. In addition, torque transferred from the speed change mechanism TM to the output shaft O is obtained by multiplying torque transferred from the intermediate shaft M to the speed change mechanism TM by the speed ratio.

In the example, the plurality of engagement devices (including the second engagement device CL2) of the speed change mechanism TM and the first engagement device CL1 are each a friction engagement element such as a clutch and a brake formed to include friction members. Each of the friction engagement elements can be continuously controlled such that the transfer torque capacity of the friction engagement element is increased and decreased by controlling the engagement pressure of the friction engagement element by controlling the supplied hydraulic pressure. A wet multi-plate clutch or a wet multi-plate brake, for example, may be suitably used as the friction engagement elements.

A friction engagement element transfers torque between the engagement members of the friction engagement element through friction between the engagement members. In the case where there is a difference in rotational speed (slip) between the engagement members of the friction engagement element, torque (hereinafter referred to as "slip transfer torque" or "transfer torque") corresponding to the magnitude of the transfer torque capacity is transferred from a member with a higher rotational speed to a member with a lower rotational speed through dynamic friction. In the case where there is no difference in rotational speed (slip) between the engagement members of the friction engagement element, torque up to the magnitude of the transfer torque capacity is transferred between the engagement members of the friction engagement element through static friction. Here, the term "transfer torque capacity" refers to the magnitude of maximum torque that can be transferred by a friction engagement element through friction. The magnitude of the transfer torque capacity is varied in proportion to the engagement pressure of the friction engagement element. The term "engagement pressure" refers to a pressure that presses an input-side engagement member (friction plate) and an output-side engagement member (friction plate) against each other. In the embodiment, the engagement pressure is varied in proportion to the magnitude of the supplied hydraulic pressure. That is, in the embodiment, the magnitude of the transfer torque capacity is varied in proportion to the magnitude of the hydraulic pressure supplied to the friction engagement element.

Each of the friction engagement elements includes a return spring, and is urged to be disengaged by the reaction force of the spring. When a force produced by the hydraulic pressure supplied to a hydraulic cylinder of the friction engagement element exceeds the reaction force of the spring, the friction engagement element starts producing the transfer torque capacity to bring the friction engagement element from the disengaged state into the engaged state. The hydraulic pressure at which the transfer torque capacity starts being produced is referred to as "stroke end pressure". Each of the friction engagement elements is configured such that the transfer torque capacity of the friction engagement element is increased in proportion to an increase in supplied hydraulic pressure after the hydraulic pressure exceeds the stroke end pressure.

In the embodiment, the term "engaged state" refers to a state in which a friction engagement element is producing a transfer torque capacity. The engaged state includes a slip engagement state and a direct engagement state. The term "disengaged state" refers to a state in which a friction engagement element is not producing a transfer torque capacity. The term "slip engagement state" refers to an engagement state in which there is a difference in rotational speed (slip) between the engagement members of a friction engagement element. The term "direct engagement state" refers to an engagement state in which there is no difference in rotational speed (slip) between the engagement members of a friction engagement element. The term "non-direct engagement state" refers to an engagement state other than the direct engagement state, and includes the disengaged state and the slip engagement state.

2. Configuration of Hydraulic Pressure Control System

The hydraulic pressure control system of the vehicle drive device 1 includes a hydraulic pressure control device PC that adjusts the hydraulic pressure of working oil supplied from a mechanical or electric hydraulic pump to a predetermined pressure. Although not described in detail here, the hydraulic pressure control device PC adjusts the degree of opening of one or two or more adjustment valves on the basis of a signal pressure from a linear solenoid valve for hydraulic pressure adjustment to adjust the amount of the working oil drained from the adjustment valves, thereby adjusting the hydraulic pressure of the working oil to one or two or more predetermined pressures. After being adjusted to the predetermined pressure, the working oil is supplied to each of the friction engagement elements such as those of the speed change mechanism TM and the first engagement device CL1 and the second engagement device CL2 at a hydraulic pressure required by the friction engagement element.

3. Configuration of Control Device 30

Next, the configuration of the control device 30 which controls the vehicle drive device 1 and the engine control device 31 will be described with reference to FIG. 2.

The control units 32 to 34 of the control device 30 and the engine control device 31 each include an arithmetic processing unit such as a CPU serving as a core member, a storage device such as a RAM (random access memory) configured to read and write data from and into the arithmetic processing unit and a ROM (read only memory) configured to read data from the arithmetic processing unit, and so forth. Functional sections 41 to 47 of the control device 30 etc. are formed by software (a program) stored in the ROM of the control device or the like, hardware such as a separately provided arithmetic circuit, or a combination of both. The control units 32 to 34 of the control device 30 and the engine control device 31 are configured to communicate with each other, and perform cooperative control while sharing various information such as information detected by sensors and control parameters, thereby implementing the functions of the functional sections 41 to 47.

The vehicle drive device 1 includes sensors Se1 to Se5 that output an electrical signal to be input to the control device 30 and the engine control device 31. The control device 30 and the engine control device 31 calculate information detected by the sensors on the basis of the input electrical signal. An engine rotational speed sensor Se1 is a sensor that detects the rotational speed of the engine output shaft Eo (engine E). The engine control device 31 detects a rotational speed $\omega e$ of the engine E on the basis of a signal input from the engine speed sensor Se1. An input rotational speed sensor Se2 is a sensor that detects the rotational speed of the input shaft I and the intermediate shaft M. The rotor of the rotary electric machine MG is integrally drivably coupled to the input shaft I and the intermediate shaft M. Thus, the control device 30 detects the rotational speed $\omega m$ of the rotary electric machine MG and the rotational speed of the input shaft I and the intermediate shaft M on the basis of a signal input from the input rotational speed sensor Se2. An output rotational speed sensor Se3 is a sensor that detects the rotational speed of the output shaft O. The control device 30 detects the rotational speed of the output shaft O on the basis of a signal input from the output rotational speed sensor Se3. The rotational speed of the output shaft O is proportional to the vehicle speed. Therefore, the control device 30 calculates the vehicle speed on the basis of the signal input from the output rotational speed sensor Se3.

An accelerator operation amount detection sensor Se4 is a sensor that detects the amount of operation of an accelerator pedal AP operated by a driver to detect the accelerator operation amount. The control device 30 detects the acceleration operation amount on the basis of a signal input from the acceleration operation amount detection sensor Se4. A battery charge state detection sensor Se5 is a sensor that detects the charge state of the battery BT. In the embodiment, the battery charge state detection sensor Se5 is a sensor composed of a voltage sensor that detects a battery voltage, a current sensor that detects a battery voltage, a temperature sensor that detects a battery temperature, and so forth. The control device 30 estimates the charge amount of the battery BT on the basis of a signal input from the battery charge state detection sensor Se5.

3-1. Engine Control Device 31

The engine control device 31 includes an engine control section 41 that controls an operation of the engine E. In the embodiment, in the case where a command for the engine required torque is provided from the vehicle control unit 34, the engine control section 41 performs torque control in which an output torque command value is set to the engine required torque according to the command provided from the vehicle control unit 34, and in which the engine E is controlled so as to output torque corresponding to the output torque command value. In the case where there is an engine starting request, the engine control device 31 determines that a command is given to start combustion of the engine E, and performs control so as to start combustion of the engine E by starting to supply fuel to the engine E and ignite the fuel.

3-2. Power Transfer Control Unit 33

The power transfer control unit 33 includes a speed change mechanism control section 43 that controls the speed change mechanism TM, a first engagement device control section 44 that controls the first engagement device CL1, and a second engagement device control section 45 that controls the second engagement device CL2 during slip control.

3-2-1. Speed Change Mechanism Control Section 43

The speed change mechanism control section 43 controls establishment of a shift speed in the speed change mechanism TM. The speed change mechanism control section 43 determines a target shift speed for the speed change mechanism TM on the basis of information detected by the sensors such as the vehicle speed, the acceleration operation amount, and the shift position. Then, the speed change mechanism control section 43 controls the hydraulic pressure to be supplied to the plurality of engagement devices provided in the speed change mechanism TM via the hydraulic pressure control device PC to engage or disengage the engagement devices in order to establish the target shift speed in the speed change mechanism TM. Specifically, the speed change mechanism control section 43 provides the hydraulic pressure control device PC with a command for a target hydraulic pressure (command pressure) for the engagement devices, and the hydraulic pressure control device PC supplies the engagement devices with a hydraulic pressure at the target hydraulic pressure (command pressure) according to the command.

3-2-2. First Engagement Device Control Section 44

The first engagement device control section 44 controls the engagement state of the first engagement device CL1. In the embodiment, the first engagement device control section 44 controls the hydraulic pressure to be supplied to the first engagement device CL1 via the hydraulic pressure control device PC such that the transfer torque capacity of the first engagement device CL1 matches a first target torque capacity T1o according to the command provided from the vehicle control unit 34. Specifically, the first engagement device control section 44 provides the hydraulic pressure control device PC with a command for a target hydraulic pressure (command pressure) set on the basis of the first target torque capacity T1o, and the hydraulic pressure control device PC supplies the first engagement device CL1 with a hydraulic pressure at the target hydraulic pressure (command pressure) according to the command.

3-2-3. Second Engagement Device Control Section 45

The second engagement device control section 45 controls the engagement state of the second engagement device CL2 during slip control. In the embodiment, the second engagement device CL2 is one of a plurality of engagement devices or a singular engagement device forming a shift speed in the speed change mechanism TM. In the embodiment, the second engagement device control section 45 controls the hydraulic pressure to be supplied to the second engagement device CL2 via the hydraulic pressure control device PC such that the transfer torque capacity of the second engagement device CL2 matches a second target torque capacity T2o according to the command provided from the vehicle control unit 34. Specifically, the second engagement device control section 45 provides the hydraulic pressure control device PC with a command for a target hydraulic pressure (command pressure) set on the basis of the second target torque capacity T2o, and the hydraulic pressure control device PC supplies the second engagement device CL2 with the target hydraulic pressure (command pressure) according to the command.

3-3. Rotary Electric Machine Control Unit 32

The rotary electric machine control unit 32 includes a rotary electric machine control section 42 that controls an operation of the rotary electric machine MG. In the embodiment, the rotary electric machine control section 42 performs torque control in which an output torque command value is set to the rotary electric machine required torque Tmo according to the command from the vehicle control unit 34, and in which the rotary electric machine MG is controlled so as to output torque at the output torque command value. Specifically, the rotary electric machine control section 42 controls on and off a plurality of switching elements included in the inverter IN to control the output torque Tm of the rotary electric machine MG.

The rotary electric machine control section 42 is configured to estimate the coil temperature Tc for the rotary electric machine MG and the inverter temperature Tin on the basis of a current Ic flowing through the rotary electric machine MG and the inverter IN etc. The rotary electric machine control section 42 estimates the temperature in consideration of a response delay due to the heat capacity of the coil and the heat capacity of the inverter IN. The rotary electric machine control section 42 is configured to transfer the estimated coil temperature Tc and inverter temperature Tin to the other control units. Alternatively, the rotary electric machine control section may be configured to detect the coil temperature Tc and the inverter temperature Tin on the basis of a value output from a temperature sensor.

3-4. Vehicle Control Unit 34

The vehicle control unit 34 includes functional sections that control integration of various torque control performed on the engine E, the rotary electric machine MG, the speed change mechanism TM, the first engagement device CL1, the second engagement device CL2, and so forth, engagement control for the engagement devices, and so forth over the entire vehicle.

The vehicle control unit 34 calculates vehicle required torque Trq, which is a target drive force to be transferred from the intermediate shaft M side to the output shaft O side, and the target electric power generation amount Wgo, which is a target value for the amount of electric power generated by the rotary electric machine MG, and decides the drive mode of the engine E and the rotary electric machine MG, in accordance with the accelerator operation amount, the vehicle speed, the charge amount of the battery BT, and so forth. The vehicle control unit 34 is a functional section that calculates engine required torque Teo, which is output torque required for the engine E, rotary electric machine required torque Tmo, which is output torque required for the rotary electric machine MG, the first target torque capacity T1o, which is a transfer torque capacity required for the first engagement device CL1, and the second target torque capacity T2o, which is a transfer torque capacity required for the second engagement device CL2, to provide the calculated values to the other control units 32 and 33 and the engine control device 31 for integration control.

In the embodiment, the vehicle control unit 34 includes a slip control section 46 that performs slip control in which both the first engagement device CL1 and the second engagement device CL2 are controlled to a slip engagement state during electric power generation performed by the rotary electric machine MG, and an electric power generation-rotational speed control section 47 that performs electric power generation-rotational speed control. The slip control section 46 and the electric power generation-rotational speed control section 47 will be described in detail below.

3-4-1. Slip Control Section 46

In the embodiment, the process performed by the electric power generation-rotational speed control section 47 to be discussed later is executed during the slip control. Therefore, the slip control performed by the slip control section 46 as a precondition for the process performed by the electric power generation-rotational speed control section 47 will be first described.

In the embodiment, the slip control section 46 controls both the first engagement device CL1 and the second engagement device CL2 to the slip engagement state during electric power generation performed by the rotary electric machine MG using the drive force of the engine E. Thus, it is possible to drive the vehicle with the drive force of the engine E transferred to the wheels W while maintaining rotational drive of the engine E, and to suppress overheating of the engagement devices CL1 and CL2 by dispersing frictional heat generated by the engagement devices CL1 and CL2 to the engagement devices CL1 and CL2. That is, the slip control section 46 can drive the vehicle with the slip transfer torque of the second engagement device CL2 transferred from the drive force source to the wheels W by controlling the second engagement device CL2 to the slip engagement state. In addition, the slip control section 46 can reduce the rotational speed $\omega m$ of the rotary electric machine MG while maintaining the rotational speed $\omega e$ of the engine E by controlling the first engagement device CL1 to the slip engagement state. This makes it possible to reduce frictional heat generated by the second engagement device CL2, and to have the first engagement device CL1 carry an amount of frictional heat corresponding to the reduction.

In the case where the charge amount of the battery BT is small and the amount of electric power consumed by various electric motors such as an air conditioner is large, it is necessary to increase the electric power generation amount Wg of the rotary electric machine MG also during the slip control, and the target electric power generation amount Wgo is set to be large.

Figure 3:
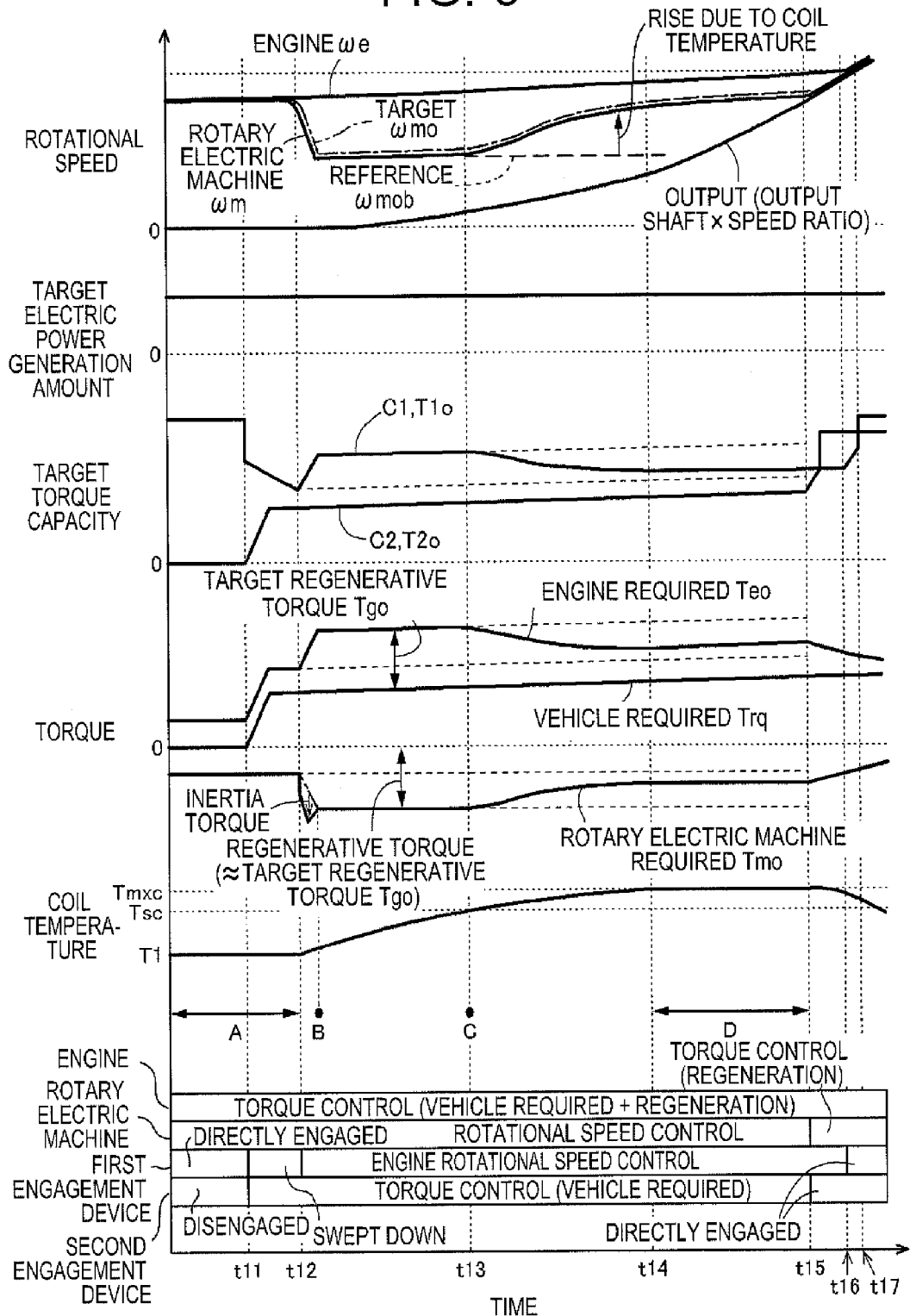
FIG. 3 is a timing chart showing a process performed by the control device according to the embodiment of the present invention.

FIG. 3 shows an example of a time chart for a period during the slip control. In the embodiment, in the case where it is necessary for the rotary electric machine MG to generate electric power and the vehicle is stationary, such as in the case where the charge amount of the battery BT is small and the amount of electric power consumed by the electric motor is large, the vehicle control unit 34 executes a stationary vehicle-engine electric power generation mode in which the rotary electric machine MG is caused to generate electric power using the rotational drive force of the engine E with the engine E rotationally driven, rather than stopped, even through the vehicle is stationary. In the stationary vehicle-engine electric power generation mode, the first engagement device CL1 is controlled to the direct engagement state, and the second engagement device CL2 is controlled to the disengaged state. Hence, the drive force of the engine E is transferred to the rotary electric machine MG, and not transferred to the wheels W. Here, the target rotational speed for the engine E and the rotary electric machine MG is decided on the basis of the target electric power generation amount Wgo, and set to such a target rotational speed that the temperature of the coil of the rotary electric machine MG and the inverter IN is not raised too much through the electric power generation.

In the case where the vehicle is requested to accelerate when the vehicle is stationary, the first engagement device CL1 is controlled to the direct engagement state, the second engagement device CL2 is controlled to the disengaged state, and the rotary electric machine MG is caused to generate electric power using the drive force of the engine E such as in the stationary vehicle-engine electric power generation mode, the vehicle control unit 34 causes the slip control section 46 to start slip control (time t11).

After starting the slip control, the slip control section 46 starts torque control, in which the second target torque capacity T2o for the second engagement device CL2 is set in accordance with the vehicle required torque Trq, to cause the second engagement device CL2 to transition from the disengaged state to the slip engagement state, and increases the speed of the vehicle (rotational speed of the output shaft O) by allowing an amount of torque corresponding to the vehicle required torque Trq to be transferred to the wheels W side using the slip transfer torque of the second engagement device CL2 (time t11 to time t15).

After starting the slip control, in addition, the slip control section 46 executes sweep down, in which the first target torque capacity T1o for the first engagement device CL1 is gradually decreased from the complete engagement capacity, to cause the first engagement device CL1 to transition from the direct engagement state to the slip engagement state. In the case where there is a rotational speed difference between the rotational speed $\omega e$ of the engine E and the rotational speed $\omega m$ of the rotary electric machine MG, the slip control section 46 determines that the first engagement device CL1 is brought into the slip engagement state, and finishes decreasing the first target torque capacity T1o for the first engagement device CL1, and starts engine rotational speed control in which the first target torque capacity T1o is varied such that the rotational speed $\omega e$ of the engine E becomes closer to the target rotational speed $\omega mo$ (time t12).

The complete engagement capacity is a transfer torque capacity of an engagement device at which an engaged state without slipping can be maintained even if torque transferred from the drive force source to the engagement device is fluctuated. In the embodiment, the complete engagement capacity is set to a transfer torque capacity at which the engagement device does not slip even if torque transferred from the drive force source to the engagement device becomes maximum.

In the case where it is determined that the first engagement device CL1 is brought into the slip engagement state, the slip control section 46 causes the electric power generation-rotational speed control section 47 to start electric power generation-rotational speed control (time t12). That is, the electric power generation-rotational speed control is executed in the case where both the first engagement device CL1 and the second engagement device CL2 are brought into the slip engagement state and the rotary electric machine MG is generating electric power (time t12 to time t15).

In order to maintain the first engagement device CL1 in the slip engagement state with a predetermined rotational speed difference, the electric power generation-rotational speed control section 47 sets the target rotational speed $\omega mo$ for the rotary electric machine MG during the electric power generation-rotational speed control to a rotational speed that is lower than the rotational speed $\omega e$ of the engine E.

That is, the electric power generation-rotational speed control section 47 controls the output torque Tm (regenerative torque) of the rotary electric machine MG such that the rotational speed $\omega m$ of the rotary electric machine MG generating electric power becomes closer to the target rotational speed $\omega mo$, which is set to a rotational speed that is lower than the rotational speed $\omega e$ of the engine E.

In the embodiment, the electric power generation-rotational speed control section 47 sets a reference rotational speed $\omega mob$ to a rotational speed that is lower than the rotational speed $\omega e$ of the engine E by a predetermined value. In the case where it is not necessary to correctively increase the target rotational speed $\omega mo$ on the basis of a monitoring target temperature, the electric power generation-rotational speed control section 47 performs rotational speed control by setting the target rotational speed $\omega mo$ to the reference rotational speed $\omega mob$ (time t12 to time t13).

In the case where a correction based on the monitoring target temperature is necessary, the electric power generation-rotational speed control section 47 performs the electric power generation-rotational speed control by deciding the target rotational speed $\omega mo$ on the basis of the monitoring target temperature (time t13 to time t15). In addition, the electric power generation-rotational speed control section 47 executes the electric power generation amount maintaining control in which the electric power generation amount Wg of the rotary electric machine MG is maintained at the target electric power generation amount Wgo during the electric power generation-rotational speed control (time t12 to time t15).

In order to cause the second engagement device CL2 to transition from the slip engagement state to the direct engagement state in the case where the rotational speed of the output shaft O rises and the rotational speed difference between an output rotational speed calculated by multiplying the rotational speed of the output shaft O by the speed ratio of the speed change mechanism TM and the rotational speed $\omega m$ of the rotary electric machine MG becomes equal to or less than a predetermined value, the slip control section 46 starts sweep up in which the second target torque capacity T2o for the second engagement device CL2 is gradually increased to the complete engagement capacity (time t15). In addition, the slip control section 46 terminates the electric power generation-rotational speed control for the rotary electric machine MG, and starts torque control for the rotary electric machine MG (time t15).

Here, the output rotational speed is a rotational speed obtained by converting the rotational speed of the output shaft O into a rotational speed on the rotary electric machine MG side, and the rotational speed difference between the output rotational speed and the rotational speed ωm of the rotary electric machine MG corresponds to the difference in rotational speed between the engagement members of the second engagement device CL2.

In order to cause the first engagement device CL1 to transition from the slip engagement state to the direct engagement state in the case where the rotational speed of the output shaft O further rises and the rotational speed difference between the rotational speed ωm of the rotary electric machine MG and the rotational speed ωe of the engine E becomes equal to or less than a predetermined value (time t16), the slip control section 46 terminates the engine rotational speed control for the first engagement device CL1, starts sweep up in which the first target torque capacity T1o for the first engagement device CL1 is gradually increased to the complete engagement capacity, and after the sweep up is terminated, terminates the sequence of slip control (time t17).

3-4-2. Electric Power Generation-Rotational Speed Control Section 47

Next, the electric power generation-rotational speed control section 47 which executes the electric power generation-rotational speed control during the slip control will be described in detail.

As described above, the electric power generation-rotational speed control section 47 is a functional section that executes electric power generation-rotational speed control in which the output torque Tm of the rotary electric machine MG is controlled such that the rotational speed ωm of the rotary electric machine MG becomes closer to the target rotational speed ωmo with both the first engagement device CL1 and the second engagement device CL2 brought into the slip engagement state and with the rotary electric machine MG generating electric power.

The electric power generation-rotational speed control section 47 executes, in the electric power generation-rotational speed control, electric power generation amount maintaining control in which at least one of the temperature of the rotary electric machine MG and the temperature of the inverter IN is monitored as a monitoring target temperature and in which the target rotational speed ωmo is decided on the basis of the monitoring target temperature and the electric power generation amount Wg of the rotary electric machine MG during the electric power generation-rotational speed control is maintained at the target electric power generation amount Wgo.

In the embodiment, the electric power generation-rotational speed control section 47 is configured to perform the electric power generation-rotational speed control while both the first engagement device CL1 and the second engagement device CL2 are controlled to the slip engagement state through the slip control described above during electric power generation performed by the rotary electric machine MG using the drive force of the engine E.

3-4-2-1. Heat Generation Properties of Rotary Electric Machine MG

First, the heat generation properties of the coil of the rotary electric machine MG will be described.

The electric power generation amount Wg of the rotary electric machine MG is proportional to a value obtained by multiplying the magnitude (absolute value) of regenerative torque Tg and the rotational speed ωm of the rotary electric machine MG as indicated by the formula (1):

$$Wg \propto |Tg| \times \omega m \quad (1)$$

Figure 4:
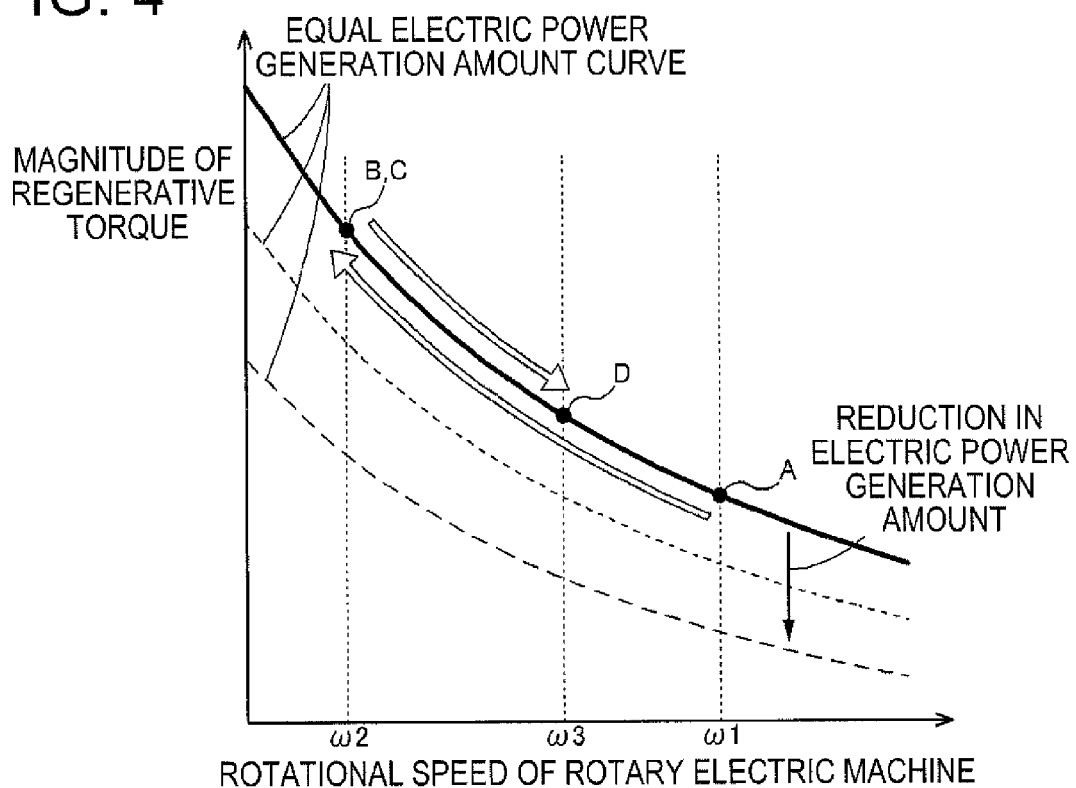
FIG. 4 illustrates a process performed by the control device according to the embodiment of the present invention.

Hence, on condition that the electric power generation amount Wg is constant, the magnitude of the regenerative torque Tg is varied in inverse proportion to the rotational speed ωm of the rotary electric machine MG as shown in FIG. 4 and as indicated by the formula (2):

$$|Tg| \propto Wg/\omega m \quad (2)$$

Therefore, in order to maintain the electric power generation amount Wg at the same value in the case where the rotational speed ωm of the rotary electric machine MG is reduced as in the slip control, for example, it is necessary to increase the magnitude of the regenerative torque Tg (for example, a transition from an operation point A to an operation point B in FIG. 4).

The current Ic flowing through the coil of the rotary electric machine MG increases in proportion to the magnitude of the regenerative torque Tg as indicated by the formula (3):

$$Ic \propto |Tg| \quad (3)$$

A heat generation amount Wc of the coil increases in proportion to the square of the current Ic flowing through the coil of the rotary electric machine MG as indicated by the formula (4):

$$Wc \propto Ic^2 \quad (4)$$

In the steady state, the temperature Tc of the coil is a temperature at which the heat generation amount Wc due to the current Ic applied to the coil, the amount of heat radiated from the coil, and the cooling amount are balanced, and the coil temperature Tc is increased as the heat generation amount Wc due to the current Ic is increased. Meanwhile, on condition that the electric power generation amount Wg is constant, the heat generation amount Wc due to the current Ic is varied in inverse proportion to the square of the rotational speed ωm of the rotary electric machine MG as indicated by the formulas (2), (3), and (4) given above.

Figure 5:
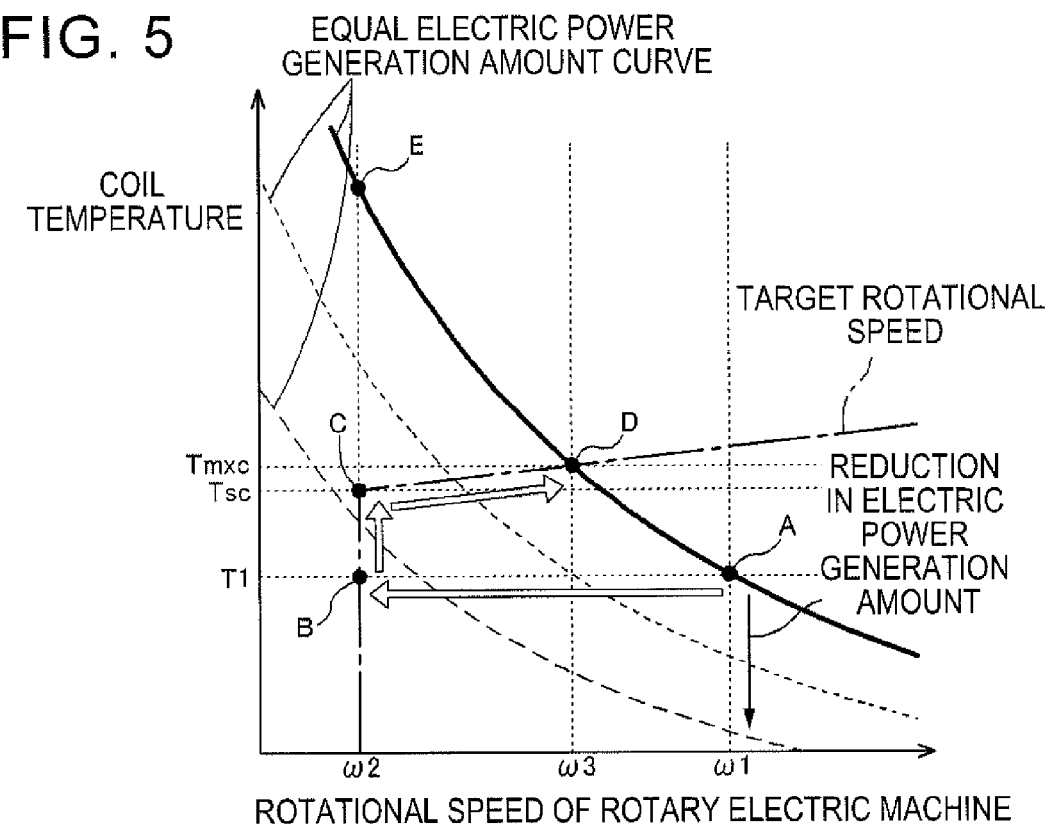
FIG. 5 illustrates the process performed by the control device according to the embodiment of the present invention.

Hence, on condition that the electric power generation amount Wg is constant, the coil temperature Tc is raised as the rotational speed ωm of the rotary electric machine MG is reduced as shown in FIG. 5.

3-4-2-2. Rise in Rotational Speed According to Temperature of Rotary Electric Machine MG As shown in FIG. 5, for example, before the rotational speed ωm of the rotary electric machine MG is reduced through the slip control (ω1), the coil temperature Tc is suppressed to a temperature T1 that is equal to or less than a tolerable upper-limit temperature Tmxc (operation point A) even in the case where the electric power generation amount Wg is set to a large value, which suppresses the possibility of progress of degradation of the coil due to a high temperature. In the case where the rotational speed ωm of the rotary electric machine MG is reduced through the slip control (ω2) and the electric power generation amount Wg is not varied but maintained at a constant value, however, the coil temperature Tc is at a temperature exceeding the tolerable upper-limit temperature Tmxc in the steady state as indicated by an operation point E in FIG. 5, which poses the possibility of degradation of the coil due to a high temperature. Thus, in order for the coil temperature Tc not to exceed the tolerable upper-limit temperature Tmxc of the coil, it is necessary to raise the rotational speed ωm of the rotary electric machine MG from a rotational speed (ω2) set through the slip control to be equal to or more than a rotational speed (ω3, operation point D) at which the coil temperature Tc is steadily at the tolerable upper-limit temperature Tmxc, for example.

Here, the coil temperature Tc is varied with a response delay such as a first-order delay, for example, with respect to variations in heat generation amount Wc of the coil because of the heat capacity of the coil or the like. Therefore, as shown in FIG. 5, after the rotational speed $\omega m$ of the rotary electric machine MG is reduced from the operation point A to the operation point B through the slip control, the coil temperature Tc rises from the operation point B to the operation point E with a response delay. Hence, there is a time lag, that is, an allowable time, after the rotational speed $\omega m$ of the rotary electric machine MG is reduced through the slip control until the coil temperature Tc exceeds the tolerable upper-limit temperature Tmxc.

Thus, in the electric power generation-rotational speed control, the rotational speed $\omega m$ of the rotary electric machine MG is maintained as long as possible at the reference rotational speed $\omega mob$, which is set to a relatively small value through the slip control, during the allowable time due to the response delay in variations in coil temperature Tc, so as not to impair the advantages for the slip control such as a reduction in heat generated by the second engagement device CL2. That is, the electric power generation-rotational speed control section 47 is configured to raise the rotational speed $\omega m$ of the rotary electric machine MG in accordance with the coil temperature Tc which rises with a response delay due to the heat capacity of the coil as discussed later.

3-4-2-3. Measures Against Heat Generated by Inverter IN

Now, the heat generation properties of the inverter IN will be described.

The amount of heat generated by the inverter IN increases as the current Ic flowing through the rotary electric machine MG increases, as for the coil of the rotary electric machine MG.

In the steady state, the temperature Tin of the inverter IN is a temperature at which the amount of heat generated by the inverter IN because of the current Ic, the amount of heat radiated from the inverter IN, and the cooling amount are balanced, and the inverter temperature Tin is increased as the heat generation amount due to the current Ic is increased. Hence, as for the coil described above, on condition that the electric power generation amount Wg is constant, the inverter temperature Tin is increased as the rotational speed $\omega m$ of the rotary electric machine MG is reduced. Hence, in order for the inverter Tin not to exceed a tolerable upper-limit temperature Tmxi for the inverter IN, it is necessary to raise the rotational speed $\omega m$ of the rotary electric machine MG from the reference rotational speed $\omega mob$ set through the slip control.

Variations in temperature of the inverter IN are subjected to a response delay due to the heat capacity of the inverter IN as for the coil described above. Hence, the rotational speed $\omega m$ of the rotary electric machine MG is maintained as long as possible at a rotational speed (reference rotational speed $\omega mob$) set to a relatively small value through the slip control during the allowable time due to the response delay in variations in inverter temperature Tin so as not to impair the advantages for the slip control such as a reduction in heat generated by the second engagement device CL2. That is, the electric power generation-rotational speed control section 47 is configured to raise the rotational speed $\omega m$ of the rotary electric machine MG also in accordance with the inverter temperature Tin as discussed later.

3-4-2-4. Configuration of Electric Power Generation-Rotational Speed Control Section 47

3-4-2-4-1. Decision of Target Rotational Speed $\omega mo$ Based on Monitoring Target Temperature Next, the configuration of the electric power generation-rotational speed control section 47 according to the embodiment will be described in detail.

As described above, the electric power generation-rotational speed control section 47 is configured to monitor at least one of the coil temperature Tc as the temperature of the rotary electric machine MG and the temperature Tin of the inverter IN as a monitoring target temperature to decide the target rotational speed $\omega mo$ on the basis of the monitoring target temperature.

First, the method of deciding the target rotational speed $\omega mo$ in the case where the monitoring target temperature is the coil temperature Tc will be described in detail.

Figure 6:
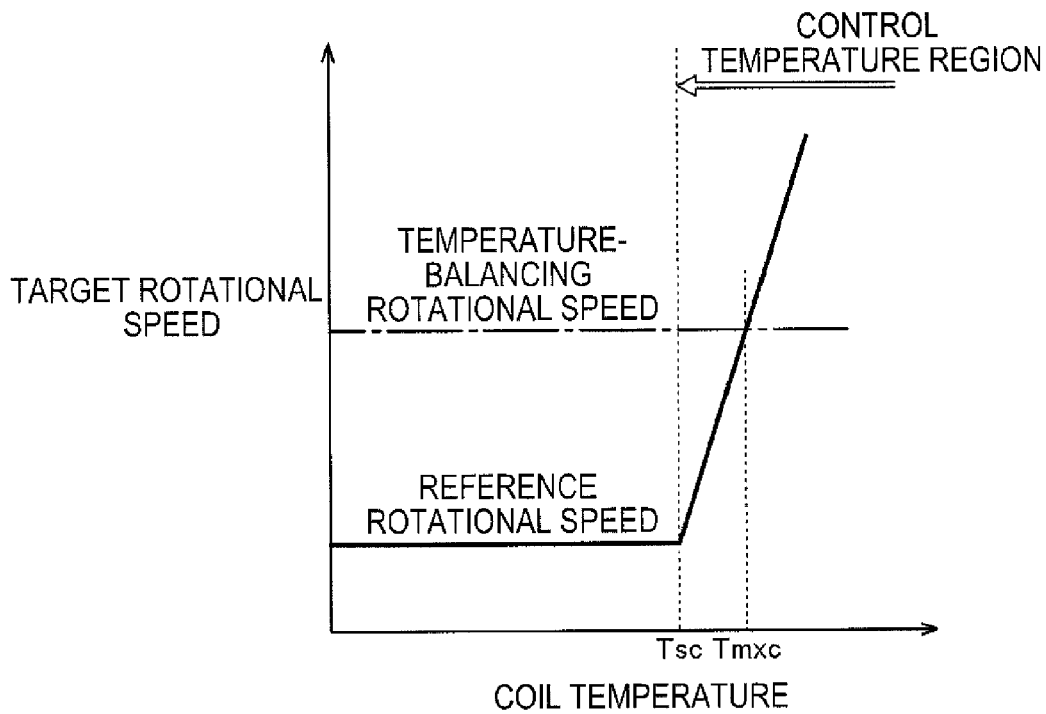
FIG. 6 illustrates the process performed by the control device according to the embodiment of the present invention.

As shown in the example of FIG. 6, the electric power generation-rotational speed control section 47 is configured to decide the target rotational speed $\omega mo$ such that the target rotational speed $\omega mo$ becomes higher as the coil temperature Tc becomes higher in the case where the coil temperature Tc falls within a control temperature region determined in advance. In the example shown in FIG. 6, the control temperature region is set to a temperature region that is equal to or more than a control start temperature Tsc that is lower than the tolerable upper-limit temperature Tmxc by a predetermined temperature.

Figure 7:
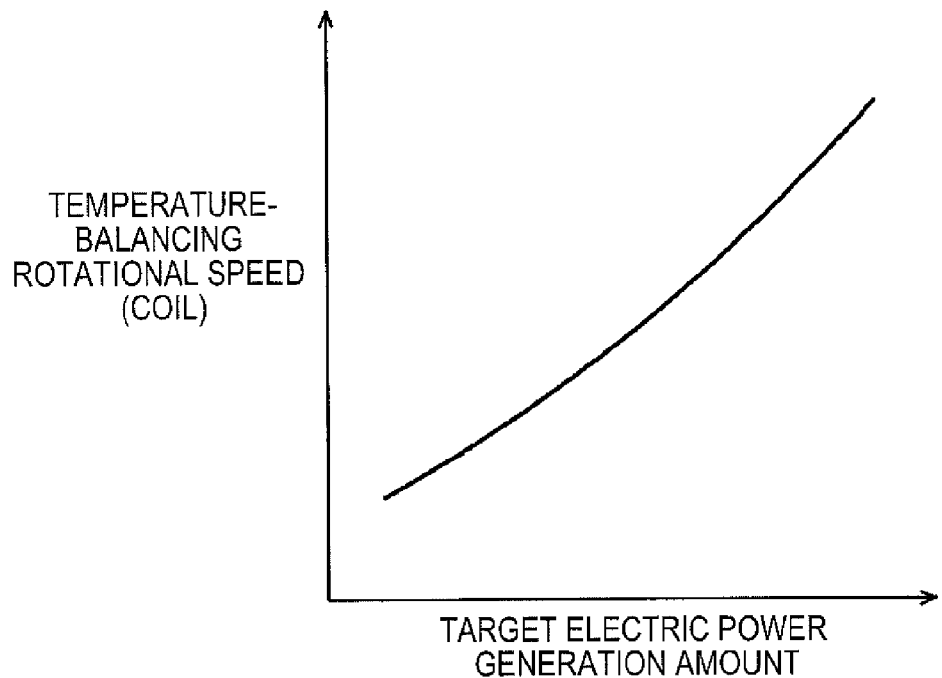
FIG. 7 illustrates the process performed by the control device according to the embodiment of the present invention.

In addition, as shown in FIG. 6, in the case where the coil temperature Tc as the monitoring target temperature becomes the tolerable upper-limit temperature Tmxc determined in advance, the electric power generation-rotational speed control section 47 increases the target rotational speed $\omega mo$ to a temperature-balancing rotational speed that is a rotational speed which is prescribed in accordance with the target electric power generation amount Wgo and at which the coil temperature Tc does not exceed the tolerable upper-limit temperature Tmxc irrespective of the operating time of the rotary electric machine MG (that is, steadily). As shown in the example of FIG. 7, the temperature-balancing rotational speed increases as the target electric power generation amount Wgo increases. The temperature-balancing rotational speed is decided on the basis of the relationship between the target electric power generation amount Wgo and the temperature-balancing rotational speed set in advance for each coil temperature Tc as shown in FIG. 7.

With such a configuration, in the case where the coil temperature Tc becomes the tolerable upper-limit temperature Tmxc, the rotational speed $\omega m$ of the rotary electric machine MG is raised to the temperature-balancing rotational speed at which the coil temperature Tc is steadily at the tolerable upper-limit temperature Tmxc, which prevents the coil temperature Tc from exceeding the tolerable upper-limit temperature Tmxc.

The electric power generation-rotational speed control section 47 may be configured to increase the target rotational speed $\omega mo$ to a rotational speed that is higher than the temperature-balancing rotational speed in the case where the coil temperature Tc becomes the tolerable upper-limit temperature Tmxc. With such a configuration, it is possible to more reliably prevent the coil temperature Tc from exceeding the tolerable upper-limit temperature Tmxc.

In addition, the temperature-balancing rotational speed may be set to a value that is fixed irrespective of variations in target electric power generation amount Wgo, such as a predetermined temperature-balancing rotational speed corresponding to the maximum target electric power generation amount Wgo that may be set during the slip control, or a predetermined rotational speed at which the coil temperature Tc does not exceed the tolerable upper-limit temperature Tmxc even if fluctuations or disturbances occur. With such a configuration, it is possible to reliably prevent the coil temperature Tc from exceeding the tolerable upper-limit temperature Tmxc with a simple configuration.

In the example shown in FIG. 6, in addition, the electric power generation-rotational speed control section 47 is configured to gradually increase the target rotational speed ωmo from the reference rotational speed ωmob decided through the slip control to the temperature-balancing rotational speed as the coil temperature Tc rises from the control start temperature Tsc to the tolerable upper-limit temperature Tmxc.

With such a configuration, as the coil temperature Tc is brought from the control start temperature Tsc closer to the tolerable upper-limit temperature Tmxc, the rotational speed ωm of the rotary electric machine MG is raised and the magnitude of the regenerative torque is decreased to decrease the amount of heat generated by the coil as the monitoring target object. Hence, as the coil temperature Tc becomes closer to the tolerable upper-limit temperature Tmxc, the rising speed of the coil temperature Tc is decreased, and it is possible to smoothly converge the coil temperature Tc to a temperature that is equal to or less than the tolerable upper-limit temperature Tmxc without overshooting the tolerable upper-limit temperature Tmxc.

In the example shown in FIG. 6, the target rotational speed ωmo is increased at a constant gradient as the coil temperature Tc increases. However, the target rotational speed ωmo may be increased at any gradient. In addition, the target rotational speed ωmo may be increased stepwise from the reference rotational speed ωmob to the temperature-balancing rotational speed when the coil temperature Tc is equal to or less than the tolerable upper-limit temperature Tmxc.

In the example shown in FIG. 6, in addition, the electric power generation-rotational speed control section 47 is configured to further gradually increase the target rotational speed ωmo from the temperature-balancing rotational speed as the coil temperature Tc increases from the tolerable upper-limit temperature Tmxc. With such a configuration, it is possible to further increase the target rotational speed ωmo from the temperature-balancing rotational speed, and to prevent the coil temperature Tc from significantly exceeding the tolerable upper-limit temperature Tmxc, even in the case where the coil temperature Tc exceeds the tolerable upper-limit temperature Tmxc because of some factor.

Alternatively, the electric power generation-rotational speed control section 47 may be configured to gradually increase the target rotational speed ωmo from the temperature-balancing rotational speed until the coil temperature Tc becomes equal to or less than the tolerable upper-limit temperature Tmxc in the case where the coil temperature Tc exceeds the tolerable upper-limit temperature Tmxc.

As shown in FIG. 6, the electric power generation-rotational speed control section 47 is configured to decide the target rotational speed ωmo as the reference rotational speed ωmob in the case where the coil temperature Tc is less than the lower-limit value (control start temperature Tsc) of the control temperature region determined in advance.

Here, the reference rotational speed ωmob may be set to a lower-limit rotational speed at which the target electric power generation amount Wgo can be secured. The lower-limit rotational speed is set to a rotational speed at which the electric power generation amount Wg of the rotary electric machine MG becomes the target electric power generation amount Wgo in the case where the rotary electric machine MG is caused to output regenerative torque with the maximum magnitude that can be output from the rotary electric machine MG.

With such a configuration, it is possible to reduce the rotational speed ωm of the rotary electric machine MG to a lower limit at which the target electric power generation amount Wgo can be secured, and to decrease the difference in rotational speed between the engagement members of the second engagement device CL2, in a period in which the target rotational speed ωmo is not increased on the basis of the coil temperature Tc during the slip control, such as a period from time t12 to time t13 shown in FIG. 3. Hence, it is possible to reduce heat generated by the second engagement device CL2 in the slip engagement state. The amount of heat generated by the engagement device in the slip engagement state is proportional to a value obtained by multiplying the difference in rotational speed between the engagement members and the slip transfer torque.

Next, the target rotational speed ωmo for a case where the monitoring target temperature is the inverter temperature Tin will be described.

Figure 8:
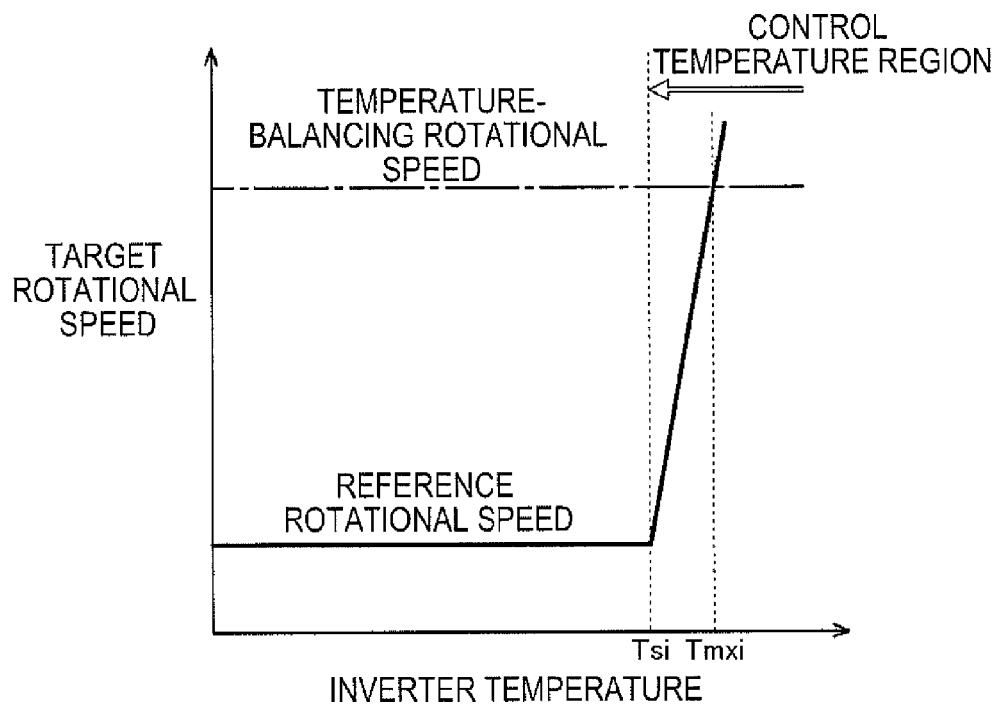
FIG. 8 illustrates the process performed by the control device according to the embodiment of the present invention.
Figure 9:
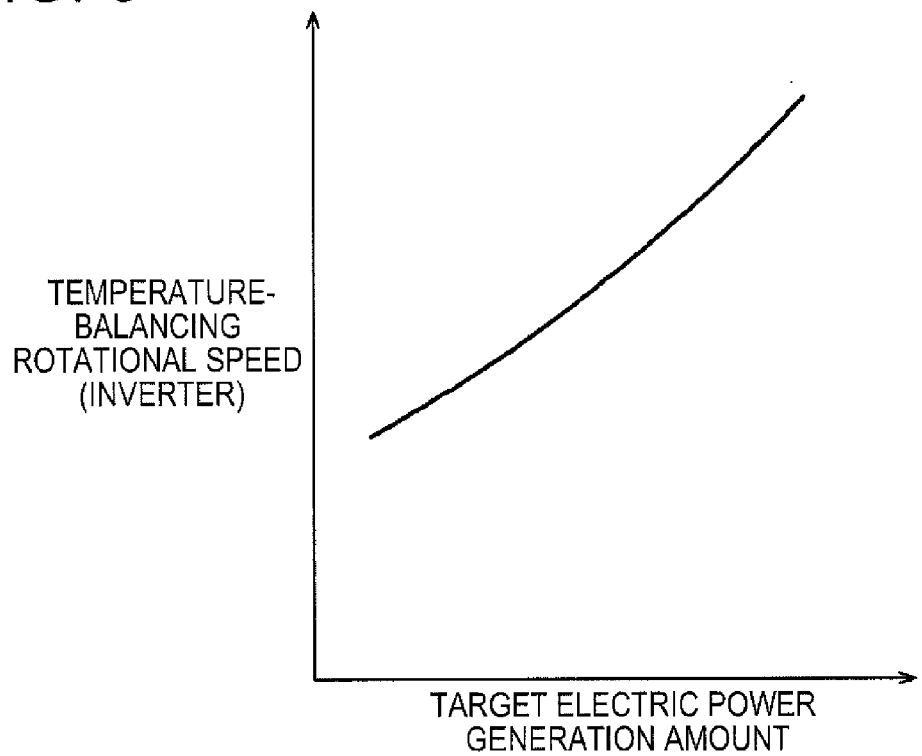
FIG. 9 illustrates the process performed by the control device according to the embodiment of the present invention.

The electric power generation-rotational speed control section 47 is configured to decide the target rotational speed ωmo on the basis of the inverter temperature Tin by the same method as in the case of the coil temperature Tc which has been described so far. FIGS. 6 and 7 for a case where the monitoring target temperature is the coil temperature Tc correspond to FIGS. 8 and 9, respectively, for a case where the monitoring target temperature is the inverter temperature Tin. The tolerable upper-limit temperature Tmxc and the control start temperature Tsc for a case where the monitoring target temperature is the coil temperature Tc correspond to the tolerable upper-limit temperature Tmxi and a control start temperature Tsi shown in FIG. 8, respectively, for a case where the monitoring target temperature is the inverter temperature Tin.

The set values for the control temperature region, the tolerable upper-limit temperature Tmxi, the control start temperature Tsi, the temperature-balancing rotational speed, and so forth for a case where the monitoring target temperature is the inverter temperature Tin are set in accordance with the heat generation properties of the inverter. IN etc.

Next, an example of a case where both the coil temperature Tc and the inverter temperature Tin are set as the monitoring target temperature will be described.

The electric power generation-rotational speed control section 47 is configured to decide a first target rotational speed ωmo1 based on the coil temperature Tc as the temperature of the rotary electric machine MG and a second target rotational speed ωmo2 based on the temperature of the inverter IN, and to decide the target rotational speed ωmo on the basis of the higher one of the first target rotational speed ωmo1 and the second target rotational speed ωmo2.

Figure 10:
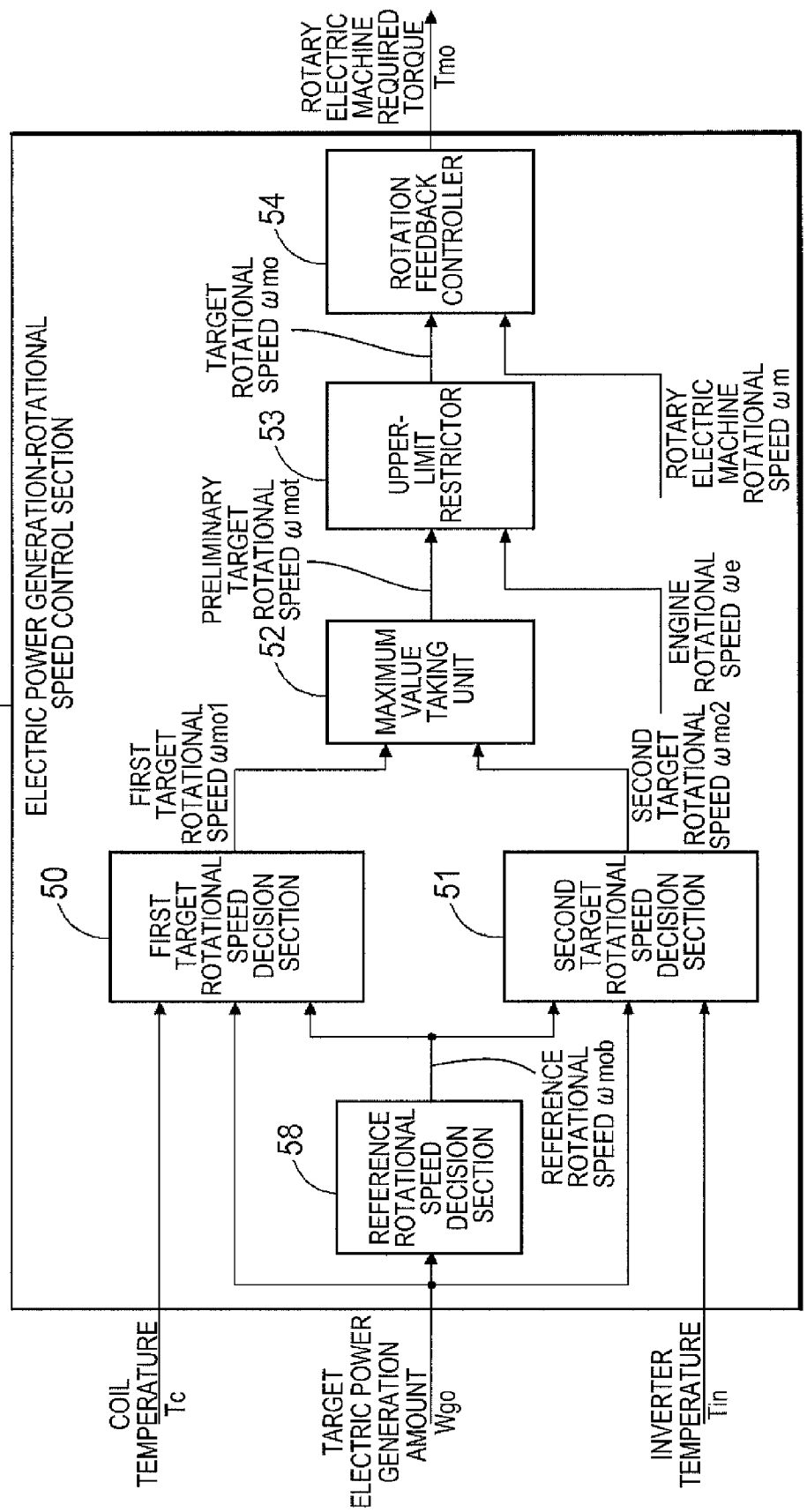
FIG. 10 is a block diagram showing the configuration of an electric power generation-rotational speed control section according to the embodiment of the present invention.

In the example shown in FIG. 10, a first target rotational speed decision section 50 provided in the electric power generation-rotational speed control section 47 is configured to decide the first target rotational speed ωmo1 on the basis of the coil temperature Tc as described above, and a second target rotational speed decision section 51 is configured to decide the second target rotational speed ωmo2 on the basis of the inverter temperature Tin. A maximum value taking unit 52 is configured to set a preliminary target rotational speed ωmot to the higher one of the first target rotational speed ωmo1 and the second target rotational speed ωmo2.

In the example shown in FIG. 10, in addition, a reference rotational speed decision section 58 is configured to decide the reference rotational speed ωmob on the basis of the target electric power generation amount Wgo as described above. Alternatively, the reference rotational speed decision section 58 may be configured to use the reference rotational speed ωmob decided by the slip control section 46.

When the rotational speed ωm of the rotary electric machine MG becomes higher than the rotational speed ωe of the engine E with the first engagement device CL1 in the slip engagement state, slip transfer torque is transferred through the first engagement device CL1 from the rotary electric machine MG side to the engine E side, which does not allow the rotary electric machine MG to generate electric power using the drive force of the engine E.

Therefore, in the example shown in FIG. 10, an upper-limit restrictor 53 is configured to set the target rotational speed ωmo to a value obtained by restricting the upper limit of the preliminary target rotational speed ωmot to the rotational speed ωe of the engine E. Specifically, the upper-limit restrictor 53 is configured to set the target rotational speed ωmo to a value that is the smaller of the preliminary target rotational speed ωmot and the rotational speed ωe of the engine E.

With such a configuration, it is possible to maintain the rotational speed ωm of the rotary electric machine MG at a value that is equal to or less than the rotational speed ωe of the engine E. Hence, it is possible to maintain a state in which slip transfer torque of the first engagement device CL1 is transferred from the engine E side to the rotary electric machine MG side, and to continuously allow the rotary electric machine MG to generate electric power using the drive force of the engine E.

In the embodiment, in addition, the electric power generation-rotational speed control section 47 is configured to cause the first engagement device CL1 to transition from the slip engagement state to the direct engagement state in the case where the upper limit of the target rotational speed ωmo, which is decided on the basis of the monitoring target temperature, is restricted to the rotational speed ωe of the engine E so that the rotational speed ωe of the engine E is decided as the target rotational speed ωmo. More particularly, the electric power generation-rotational speed control section 47 is configured to perform sweep up, in which the first target torque capacity T1o for the first engagement device CL1 is gradually increased to the complete engagement capacity, to cause the first engagement device CL1 to transition from the slip engagement state to the direct engagement state in the case where the rotational speed difference between the rotational speed ωm of the rotary electric machine MG and the rotational speed ωe of the engine E becomes equal to or less than a predetermined value. This allows the drive force of the engine E to be directly transferred to the rotary electric machine MG, which allows the rotary electric machine MG to stably generate electric power using the drive force of the engine E.

Alternatively, the electric power generation-rotational speed control section 47 may be configured to set the target rotational speed ωmo to the preliminary target rotational speed ωmot as it is without restricting the upper limit of the preliminary target rotational speed ωmot to the rotational speed ωe of the engine E. Also in this case, the electric power generation-rotational speed control section 47 is configured to perform sweep up, in which the first target torque capacity T1o for the first engagement device CL1 is gradually increased to the complete engagement capacity, to cause the first engagement device CL1 to transition from the slip engagement state to the direct engagement state in the case where the rotational speed difference between the rotational speed ωm of the rotary electric machine MG and the rotational speed ωe of the engine E becomes equal to or less than a predetermined value. With such a configuration, even in the case where the target rotational speed ωmo of the rotary electric machine MG is increased to exceed the rotational speed ωe of the engine E, it is possible to suppress overheating of both the rotary electric machine MG and the inverter IN by raising the rotational speed ωm of the rotary electric machine MG while ensuring that the drive force of the engine E is transferred to the rotary electric machine MG by controlling the first engagement device CL1 to the direct engagement state. In the case where the first engagement device CL1 is controlled to the direct engagement state, the rotational speed ωe of the engine E is controlled to the target rotational speed ωmo through the rotational speed control for the rotary electric machine MG together with the rotational speed ωm of the rotary electric machine MG.

In addition, the electric power generation-rotational speed control section 47 is configured to perform rotational speed control for the rotary electric machine MG in which the rotary electric machine required torque Tmo is varied such that the rotational speed ωm of the rotary electric machine MG becomes closer to the target rotational speed ωmo, and includes a rotation feedback controller 54.

3-4-2-4-2. Decision of Various Required Torques for Electric Power Generation-Rotational Speed Control As described above, the electric power generation-rotational speed control section 47 is configured to execute the electric power generation amount maintaining control in which the electric power generation amount Wg of the rotary electric machine MG during the electric power generation-rotational speed control is maintained at the target electric power generation amount Wgo.

In the embodiment, the electric power generation-rotational speed control section 47 is configured to decide target regenerative torque Tgo, which is target torque to be output from the rotary electric machine MG, on the basis of the target rotational speed ωmo and the target electric power generation amount Wgo, and to control any one or more of the transfer torque of the first engagement device CL1, the transfer torque of the second engagement device CL2, and the output torque Te of the engine E on the basis of the target regenerative torque Tgo, in the electric power generation amount maintaining control.

The rotary electric machine required torque Tmo, which is used as the output torque Tm of the rotary electric machine MG, is automatically decided through the rotational speed control for the rotary electric machine MG. Therefore, the target regenerative torque Tgo that is necessary to maintain the target electric power generation amount Wgo may not be directly set to the rotary electric machine required torque Tmo. Thus, torque (externally applied torque) applied from the outside to the inertial system of the rotary electric machine MG, that is, any one or more of the transfer torque of the first engagement device CL1, the transfer torque of the second engagement device CL2, and the output torque Te of the engine E are varied to indirectly control the rotary electric machine required torque Tmo such that the rotary electric machine required torque Tmo becomes closer to the target regenerative torque Tgo. For example, if torque applied from the outside to the inertial system of the rotary electric machine MG is increased and decreased, the rotary electric machine required torque Tmo is automatically increased and decreased through the rotational speed control by an amount corresponding to the increase and decrease in externally applied torque in order to maintain the rotational speed ωm of the rotary electric machine MG at the target rotational speed ωmo against the increase and decrease in externally applied torque.

Hence, controlling any one or more of the transfer torque of the first engagement device CL1, the transfer torque of the second engagement device CL2, and the output torque Te of the engine E on the basis of the target regenerative torque Tgo as in the configuration described above can vary the torque applied from the outside to the inertial system of the rotary electric machine MG by an amount corresponding to the increase and decrease in target regenerative torque Tgo, and automatically vary the rotary electric machine required torque Tmo through the rotational speed control by an amount corresponding to the increase and decrease in target regenerative torque Tgo.

Figure 11:
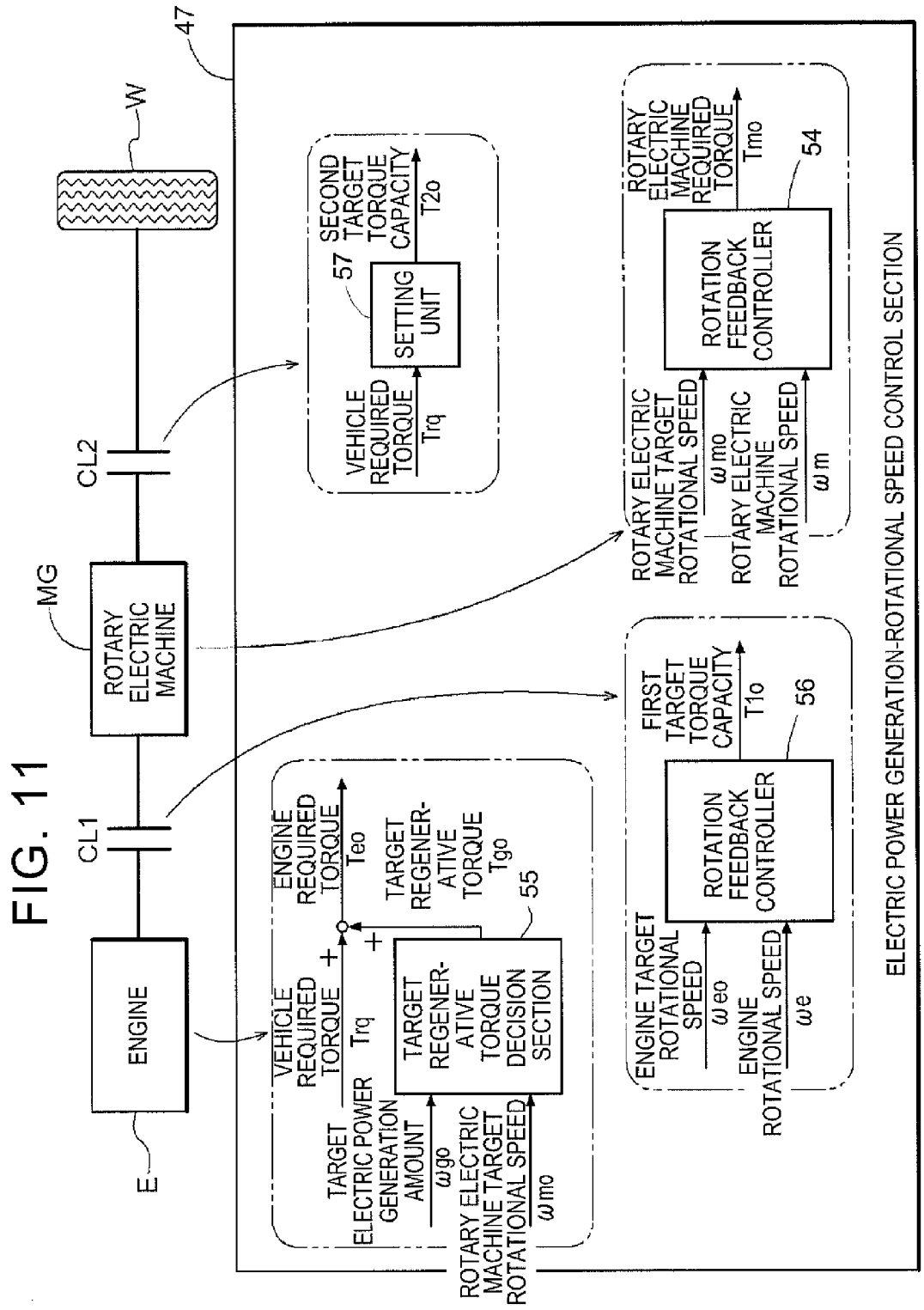
FIG. 11 is a block diagram showing the configuration of the electric power generation-rotational speed control section according to the embodiment of the present invention.

In the embodiment, as shown in FIG. 11, a target regenerative torque decision section 55 provided in the electric power generation-rotational speed control section 47 is configured to decide the target regenerative torque Tgo to be output from the rotary electric machine MG on the basis of the target rotational speed ωmo and the target electric power generation amount Wgo using the electric power generation properties indicated by the formula (1) and shown in FIG. 4. Here, the target regenerative torque Tgo corresponds to the absolute value of the regenerative torque which is negative. With such a configuration, the target regenerative torque Tgo is increased (which corresponds to the variation from the operation point A to the operation point B) in accordance with the electric power generation properties shown in FIG. 4 when the target rotational speed ωmo is decreased to the reference rotational speed ωmob with the start of the slip control, and the target regenerative torque Tgo is decreased (which corresponds to the variation from the operation point C to the operation point D) when the target rotational speed ωmo is increased from the reference rotational speed ωmob together with a rise in monitoring target temperature.

In the embodiment, in addition, the electric power generation-rotational speed control section 47 is configured to control the output torque Te of the engine E on the basis of the target regenerative torque Tgo. Specifically, as shown in FIG. 11, the electric power generation-rotational speed control section 47 is configured to perform torque control in which the engine required torque Teo is set to a value obtained by adding the target regenerative torque Tgo to the vehicle required torque Trq.

The electric power generation-rotational speed control section 47 is configured to perform engine rotational speed control, in which the first target torque capacity T1o is varied such that the rotational speed ωe of the engine E becomes closer to the target rotational speed ωeo for the engine E, as control for transfer torque of the first engagement device CL1, and includes a rotation feedback controller 56.

With such a configuration, the output torque Te of the engine E is varied by an amount corresponding to the increase and decrease in target regenerative torque Tgo. When the output torque Te of the engine E is increased and decreased, the rotational speed ωe of the engine E is urged to vary. However, the transfer torque of the first engagement device CL1 is automatically increased and decreased through the engine rotational speed control for the first engagement device CL1, and the rotational speed ωe of the engine E is maintained at the target rotational speed ωeo for the engine E. For example, if the output torque Te of the engine E is increased by an amount corresponding to an increase in target regenerative torque Tgo, the transfer torque of the first engagement device CL1 is automatically increased by an amount corresponding to an increase in output torque Te of the engine E through the engine rotational speed control. Hence, the transfer torque of the first engagement device CL1 is increased by an amount corresponding to an increase in target regenerative torque Tgo. The torque applied to the inertial system of the engine E is decreased by an amount corresponding to an increase in transfer torque, and the rotational speed ωe of the engine E is maintained at the target rotational speed ωeo.

The transfer torque of the first engagement device CL1 serves as torque applied from the outside to the inertial system of the rotary electric machine MG. When the torque applied from the outside to the inertial system of the rotary electric machine MG is increased, the output torque Tm of the rotary electric machine MG is automatically decreased by an amount corresponding to an increase in transfer torque of the first engagement device CL1 through the rotational speed control for the rotary electric machine MG described above. Hence, the output torque Tm of the rotary electric machine MG is decreased by an amount corresponding to an increase in target regenerative torque Tgo.

Thus, when the output torque Te of the engine E is increased by an amount corresponding to an increase in target regenerative torque Tgo, the transfer torque of the first engagement device CL1 is automatically increased by an amount corresponding to the increase through the engine rotational speed control performed by the first engagement device CL1, and further, the output torque Tm of the rotary electric machine MG is automatically decreased by an amount corresponding to the increase through rotary electric machine rotational speed control.

Thus, according to the configuration described above, the output torque Te of the engine E is increased by an amount corresponding to an increase in target regenerative torque Tgo, which indirectly decreases the output torque Tm of the rotary electric machine MG by an amount corresponding to an increase in target regenerative torque Tgo. This makes it possible to increase the magnitude of the regenerative torque of the rotary electric machine MG.

The electric power generation-rotational speed control section 47 is configured to perform torque control in which the vehicle required torque Trq is set as the second target torque capacity T2o, as control for the transfer torque of the second engagement device CL2, and includes a setting unit 57. Therefore, torque applied from the second engagement device CL2 side to the inertial system of the rotary electric machine MG is not varied irrespective of increase and decrease in target regenerative torque Tgo.

3-4-2-4-3. Behavior During Electric Power Generation-Rotational Speed Control

EXAMPLE 1

Next, the behavior during the electric power generation-rotational speed control will be described with reference to the example in FIG. 3.

FIG. 3 shows an example of a case where the coil temperature Tc as the monitoring target temperature reaches the control start temperature Tsc. The inverter temperature Tin as the monitoring target temperature has not reached the control start temperature Tsi (not shown). As described above, in the case where it is determined that the first engagement device CL1 is brought into the slip engagement state after the start of the slip control, the electric power generation-rotational speed control is started (time t12).

Before the target rotational speed ωmo for the rotary electric machine MG is reduced to the reference rotational speed ωmob (before time t12), the target regenerative torque Tgo is set to a relatively small value. Thus, the coil temperature Tc is maintained at the temperature T1 which is lower than the tolerable upper-limit temperature Tmxc and the control start temperature Tsc. This is because the target rotational speed for the engine E and the rotary electric machine MG before the slip control is started is set on the basis of the target electric power generation amount Wgo to such a rotational speed that the coil temperature Tc is maintained at a temperature that is lower than the tolerable upper-limit temperature Tmxc as described above.

When the target rotational speed ωmo for the rotary electric machine MG is reduced to the reference rotational speed ωmob after the start of the slip control, the target regenerative torque Tgo is increased in inverse proportion to the reduction in target rotational speed ωmo on the basis of the properties shown in FIG. 4 in order to maintain the electric power generation amount Wg of the rotary electric machine MG at the target electric power generation amount Wgo.

In the embodiment, as illustrated with reference to FIG. 11, the engine required torque Teo is increased by an amount corresponding to an increase in target regenerative torque Tgo. Then, the first target torque capacity T1o is automatically increased by an amount corresponding to the increase through the engine rotational speed control performed by the first engagement device CL1, and further, the rotary electric machine required torque Tmo is automatically decreased by an amount corresponding to the increase through the rotary electric machine rotational speed control. Hence, the rotary electric machine required torque Tmo is indirectly decreased by an amount corresponding to an increase in target regenerative torque Tgo, and the electric power generation amount Wg of the rotary electric machine MG is maintained at the target electric power generation amount Wgo.

When the target rotational speed ωmo is reduced and the magnitude of the regenerative torque Tg is increased, the heat generation amount Wc of the coil is increased. The coil temperature Tc rises with a response delay due to the heat capacity of the coil etc. with respect to the increase in heat generation amount Wc of the coil (time t12 to time t13). Hence, there is a time lag after the target rotational speed ωmo is reduced until the coil temperature Tc reaches the control start temperature Tsc (period from time t12 to time t13). During the time lag, it is possible to maintain the rotational speed ωm of the rotary electric machine MG at the reference rotational speed ωmob which is set to a relatively small value, to reduce the difference in rotational speed between the engagement members of the second engagement device CL2, and to reduce the amount of heat generated by the second engagement device CL2.

When the coil temperature Tc exceeds the control start temperature Tsc, the target rotational speed ωmo in the electric power generation-rotational speed control is increased from the reference rotational speed ωmob as the coil temperature Tc increases. In the example shown in FIG. 3, as described above, the electric power generation-rotational speed control section 47 is configured to gradually increase the target rotational speed ωmo from the reference rotational speed ωmob to the temperature-balancing rotational speed as the coil temperature Tc is brought from the control start temperature Tsc closer to the tolerable upper-limit temperature Tmxc. Therefore, as shown in FIG. 3, as the coil temperature Tc is brought from the control start temperature Tsc closer to the tolerable upper-limit temperature Tmxc, the increasing speed of the coil temperature Tc is decreased, and it is possible to smoothly converge the coil temperature Tc to the tolerable upper-limit temperature Tmxc without overshooting the tolerable upper-limit temperature Tmxc. Hence, it is possible to prevent the coil temperature Tc from exceeding the tolerable upper-limit temperature Tmxc.

With the target rotational speed ωmo decided on the basis of the coil temperature Tc as described above, in addition, it is possible to reduce the target rotational speed ωmo as much as possible, and to reduce the amount of heat generated by the second engagement device CL2, in the case where the coil temperature Tc is in the range equal to or less than the control start temperature Tsc.

When the second engagement device CL2 is brought into the direct engagement state by an increase in output rotational speed, the electric power generation-rotational speed control is terminated (time t15).

EXAMPLE 2

Next, another example of the behavior during the electric power generation-rotational speed control will be described with reference to the example in FIG. 12.

Figure 12:
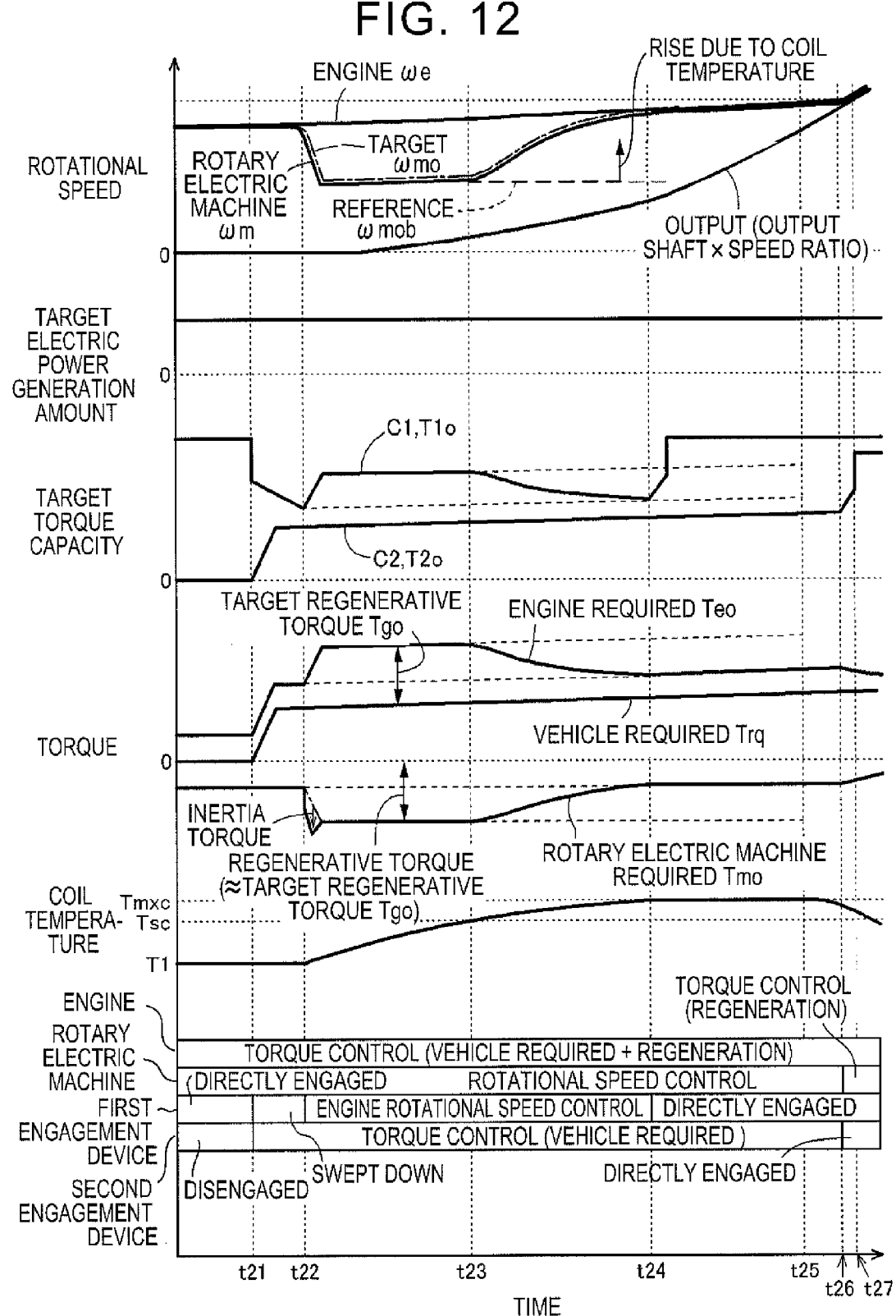
FIG. 12 is a timing chart showing the process performed by the control device according to the embodiment of the present invention.

Unlike FIG. 3, FIG. 12 shows an example of a case where the target rotational speed ωmo is increased to the rotational speed ωe of the engine E through the electric power generation-rotational speed control. Such a case occurs when a cooling medium for cooling the coil is commonly used as a cooling medium for cooling the second engagement device CL2 and the temperature of the cooling medium for cooling the coil is raised compared to that before the slip control with the second engagement device CL2 brought into the slip engagement state to generate heat during the slip control, for example. Other conditions are the same as those in the case of FIG. 3.

In the example shown in FIG. 12, the electric power generation-rotational speed control section 47 is configured to decide the target rotational speed ωmo on the basis of the coil temperature Tc such that the coil temperature Tc does not exceed the tolerable upper-limit temperature Tmxc in consideration of a rise in coil temperature Tc due to heat generated by the second engagement device CL2.

Therefore, in the example shown in FIG. 12, after the coil temperature Tc exceeds the control start temperature Tsc (at and after time t23), the target rotational speed ωmo is increased at a gradient that is larger than that in the example shown in FIG. 3, and increased to the rotational speed ωe of the engine E. As described above, the electric power generation-rotational speed control section 47 is configured to set the target rotational speed ωmo by restricting the upper limit of the target rotational speed ωmo to the rotational speed ωe of the engine E (time t24 to time t26). Therefore, the target rotational speed ωmo is restricted to a value that is equal to or less than the rotational speed ωe of the engine E. Hence, it is possible to maintain a state in which slip transfer torque of the first engagement device CL1 is transferred from the engine E side to the rotary electric machine MG side, and to allow the rotary electric machine MG to generate electric power using the drive force of the engine E.

In addition, the electric power generation-rotational speed control section 47 is configured to cause the first engagement device CL1 to transition to the direct engagement state in the case where the rotational speed difference between the rotational speed ωm of the rotary electric machine MG and the rotational speed ωe of the engine E becomes equal to or less than a predetermined value. Therefore, in the case where the rotational speed difference becomes equal to or less than a predetermined value, the first target torque capacity T1o is swept up to the complete engagement capacity to cause the first engagement device CL1 to transition into the direct engagement state (time t24). Hence, the drive force of the engine E is directly transferred to the rotary electric machine MG, which allows the rotary electric machine MG to stably generate electric power using the drive force of the engine E.

Alternatively, the electric power generation-rotational speed control section 47 may be configured to execute the electric power generation-rotational speed control to decide the target rotational speed ωmo on the basis of the coil temperature Tc, rather than to restrict the upper limit of the target rotational speed ωmo using the rotational speed ωe of the engine E as described above, after the first engagement device CL1 is caused to transition to the direct engagement state until the second engagement device CL2 is directly engaged (for a period from time t24 to time t26). With such a configuration, it is possible to more reliably suppress overheating of the coil.

Other Embodiments

Lastly, other embodiments of the present invention will be described. The configuration of each embodiment described below is not limited to its independent application, and may be applied in combination with the configuration of other embodiments unless any contradiction occurs.

(1) In the embodiment described above, one of the plurality of engagement devices of the speed change mechanism TM is used as the second engagement device CL2 which is controlled to the slip engagement state during the slip control. However, embodiments of the present invention are not limited thereto. That is, the vehicle drive device 1 may further include an engagement device provided on a portion of the power transfer path 2 between the rotary electric machine MG and the speed change mechanism TM, and the engagement device may be used as the second engagement device CL2 which is controlled to the slip engagement state during the slip control.

Alternatively, the vehicle drive device 1 may further include a torque converter provided on a portion of the power transfer path 2 between the rotary electric machine MG and the speed change mechanism TM, and a lock-up clutch that brings input and output members of the torque converter into the direct engagement state may be used as the second engagement device CL2. In this case, the second engagement device CL2 is controlled to the slip engagement state during the slip control.

In such cases, the vehicle drive device 1 may be configured not to include the speed change mechanism TM.

(2) In the embodiment described above, the speed change mechanism TM is a stepped automatic transmission. However, embodiments of the present invention are not limited thereto. That is, the speed change mechanism TM may be a transmission other than a stepped automatic transmission, such as a continuously variable automatic transmission capable of continuously changing the speed ratio. Also in this case, an engagement device provided in the speed change mechanism TM may be used as the second engagement device CL2 which is controlled to the slip engagement state during the slip control, or an engagement device provided separately from the speed change mechanism TM may be used as the second engagement device CL2.

(3) In the embodiment described above, the control device 30 includes the plurality of control units 32 to 34, and the plurality of control units 32 to 34 include the plurality of functional sections 41 to 47 in a distributed manner. However, embodiments of the present invention are not limited thereto. That is, the control device 30 may include the plurality of control units 32 to 34 as control devices integrated or separated in any combination. Also, the plurality of functional sections 41 to 47 may be distributed in any combination.

(4) In the embodiment described above, the electric power generation-rotational speed control is executed during start of the vehicle through the slip control. However, embodiments of the present invention are not limited thereto. That is, the electric power generation-rotational speed control may be executed in any state as long as both the first engagement device CL1 and the second engagement device CL2 are brought into the slip engagement state and the rotary electric machine MG is generating electric power, for example during travel at an extremely low speed or during deceleration of the vehicle.

(5) In the embodiment described above, the electric power generation-rotational speed control section 47 is described, with reference to FIG. 10, as using both the coil temperature Tc as the temperature of the rotary electric machine MG and the temperature of the inverter IN as the monitoring target temperature. However, embodiments of the present invention are not limited thereto. That is, the electric power generation-rotational speed control section 47 may use at least one of the temperature of the rotary electric machine MG and the temperature of the inverter IN as the monitoring target temperature, and may be configured to use only the temperature of the rotary electric machine MG, or only the temperature of the inverter IN, as the monitoring target temperature, for example.

(6) In the embodiment described above, the electric power generation-rotational speed control section 47 is configured to decide the target rotational speed ωmo such that the target rotational speed ωmo becomes higher as the monitoring target temperature becomes higher in the case where the monitoring target temperature falls within a control temperature region determined in advance. However, embodiments of the present invention are not limited thereto. That is, the target rotational speed ωmo may be decided by any method as long as the target rotational speed ωmo is decided on the basis of the monitoring target temperature. For example, the electric power generation-rotational speed control section 47 may be configured to vary the target rotational speed ωmo through feedback control such that the monitoring target temperature becomes closer to a target temperature that is set to be equal to or less than the tolerable upper-limit temperature Tmxc, or such that the monitoring target temperature becomes equal to or less than the target temperature.

(7) In the embodiment described above, the control temperature region is set to a temperature region that is equal to or more than the control start temperature Tsc that is a predetermined temperature lower than the tolerable upper-limit temperature Tmxc. However, embodiments of the present invention are not limited thereto. That is, the control temperature region may be set to any temperature range that is a predetermined temperature range including the tolerable upper-limit temperature Tmxc, and the target rotational speed ωmo may be decided so as to become higher as the monitoring target temperature becomes higher in the case where the monitoring target temperature falls within the control temperature region.

(8) In the embodiment described above, the electric power generation-rotational speed control section 47 is configured to decide the engine required torque Teo on the basis of the target regenerative torque Tgo. However, embodiments of the present invention are not limited thereto. That is, the electric power generation-rotational speed control section 47 may be configured to control any one or more of the transfer torque of the first engagement device CL1, the transfer torque of the second engagement device CL2, and the output torque Te of the engine E on the basis of the target regenerative torque Tgo, and may be configured to decide the first target torque capacity T1o on the basis of the target regenerative torque Tgo, for example.

For example, the electric power generation-rotational speed control section 47 may be configured to perform torque control in which the first target torque capacity T1o is set to a value obtained by adding the target regenerative torque Tgo to the vehicle required torque Trq as control for the transfer torque of the first engagement device CL1, or to perform engine rotational speed control in which the engine required torque Teo is varied such that the rotational speed ωe of the engine E becomes closer to the target rotational speed ωeo for the engine E as control for the output torque Te of the engine E.

Alternatively, the electric power generation-rotational speed control section 47 may be configured to decide the second target torque capacity T2o on the basis of the target regenerative torque Tgo such as by correcting the second target torque capacity T2o, which has been decided on the basis of the vehicle required torque Trq, on the basis of the target regenerative torque Tgo.

The present invention may be suitably applied to a control device that controls a vehicle drive device in which a first engagement device, a rotary electric machine, and a second engagement device are provided on a power transfer path connecting between an input member drivably coupled to an internal combustion engine and an output member drivably coupled to wheels and are arranged in this order from the side of the input member.

The invention claimed is:

1. A control device that controls a vehicle drive device in which a first engagement device, a rotary electric machine, and a second engagement device are provided on a power transfer path connecting between an input member drivably coupled to an internal combustion engine and an output member drivably coupled to wheels and are arranged in this order from a side of the input member, the control device comprising:

an electric power generation-rotational speed control section that executes electric power generation-rotational speed control in which output torque of the rotary electric machine is controlled such that a rotational speed of the rotary electric machine becomes closer to a target rotational speed with both the first engagement device and the second engagement device brought into a slip engagement state and with the rotary electric machine generating electric power, wherein during the electric power generation-rotational speed control, the electric power generation-rotational speed control section executes electric power generation amount maintaining control in which at least one of a temperature of the rotary electric machine and a temperature of an inverter is monitored as a monitoring target temperature, the target rotational speed is decided on the basis of the monitoring target temperature, and an amount of electric power generated by the rotary electric machine during the electric power generation-rotational speed control is maintained at a target electric power generation amount.

2. The control device according to claim 1, wherein in the case where the monitoring target temperature falls within a control temperature region determined in advance, the electric power generation-rotational speed control section decides the target rotational speed such that the target rotational speed becomes higher as the monitoring target temperature becomes higher.

3. The control device according to claim 1, wherein in the case where the monitoring target temperature becomes a tolerable upper-limit temperature determined in advance, the electric power generation-rotational speed control section increases the target rotational speed to a temperature-balancing rotational speed that is a rotational speed which is prescribed in accordance with the target electric power generation amount and at which the monitoring target temperature does not exceed the tolerable upper-limit temperature irrespective of an operating time of the rotary electric machine.

4. The control device according claim 1, wherein the electric power generation-rotational speed control section decides a first target rotational speed based on the temperature of the rotary electric machine and a second target rotational speed based on the temperature of the inverter, and decides the target rotational speed on the basis of a higher one of the first target rotational speed and the second target rotational speed.

5. The control device according to claim 1, wherein in the case where the monitoring target temperature is less than a lower-limit value of a control temperature region determined in advance, the electric power generation-rotational speed control section decides the target rotational speed as a lower-limit rotational speed at which the target electric power generation amount can be secured.

6. The control device according to claim 1, wherein during the electric power generation amount maintaining control, the electric power generation-rotational speed control section decides target torque to be output from the rotary electric machine on the basis of the target rotational speed and the target electric power generation amount, and controls any one or more of transfer torque of the first engagement device, transfer torque of the second engagement device, and output torque of the internal combustion engine on the basis of the target torque.

* * * * *